United States Patent
Link, II

(10) Patent No.: US 10,788,879 B2
(45) Date of Patent: Sep. 29, 2020

(54) METHOD AND SYSTEM FOR FOR LOW POWER INTERNETWORK COMMUNICATION WITH MACHINE DEVICES

(71) Applicant: Charles M. Link, II, Atlanta, GA (US)

(72) Inventor: Charles M. Link, II, Atlanta, GA (US)

(73) Assignee: M2 MD Technologies Inc., Atlanta, GA (US)

( * ) Notice: Subject to any disclaimer, the term of this patent is extended or adjusted under 35 U.S.C. 154(b) by 90 days.

(21) Appl. No.: 16/027,334

(22) Filed: Jul. 4, 2018

(65) Prior Publication Data

US 2018/0314314 A1    Nov. 1, 2018

Related U.S. Application Data

(63) Continuation-in-part of application No. 15/700,645, filed on Sep. 11, 2017, now Pat. No. 10,444,814.

(60) Provisional application No. 62/393,988, filed on Sep. 13, 2016.

(51) Int. Cl.
*G06F 1/32* (2019.01)
*H04W 52/02* (2009.01)
*G06F 21/81* (2013.01)
*G06F 1/3209* (2019.01)
*G06F 1/3246* (2019.01)
*H04W 88/06* (2009.01)

(52) U.S. Cl.
CPC .......... *G06F 1/3209* (2013.01); *G06F 1/3246* (2013.01); *G06F 21/81* (2013.01); *H04W 52/0261* (2013.01); *H04W 88/06* (2013.01)

(58) Field of Classification Search
CPC ...... G06F 1/3209; G06F 1/3246; G06F 21/81; H04W 52/0261
See application file for complete search history.

(56) References Cited

U.S. PATENT DOCUMENTS

| | | | | |
|---|---|---|---|---|
| 6,311,276 | B1* | 10/2001 | Connery | G06F 1/26 726/13 |
| 7,779,451 | B2* | 8/2010 | Eldar | H04L 12/12 726/2 |
| 8,219,811 | B2* | 7/2012 | Roundtree | G06F 21/51 713/169 |
| 2017/0019254 | A1* | 1/2017 | Bone | G06F 21/575 |

* cited by examiner

*Primary Examiner* — Stefan Stoynov
(74) *Attorney, Agent, or Firm* — Doughty Law, L.L.C.; John L. Doughty

(57) ABSTRACT

A wireless mobile device ("UE") operating in a battery-conserving low-power state processes incoming signaling or data in a received message to determine whether to act further on information in the message by enabling additional processing capability in the UE. A server may generate awaken information derived from a stored secret value that only the UE device and a server that manages the UE can obtain. The awaken information may also be based on a shared value shared between the server and the UE. The UE may separately derive the awaken information and may exit a low power state when awaken information received from the server in an awaken message in a first protocol matches the separately derived awaken information. The server may transmit a fall-back second awaken message in a different protocol than the first protocol if no confirmation is received that the UE received the first awaken message.

29 Claims, 26 Drawing Sheets

FIG 1

| LAYER | STATE | DESCRIPTION |
|---|---|---|
| EMM | EMM-DEREGISTERED | UE IS NOT ATTACHED TO ANY LTE NETWORK. MME DOES NOT KNOW THE CURRENT LOCATION OF THE UE, BUT MAY HAVE TRACKING AREA (TA) INFORMATION LAST REPORTED BY THE UE |
| EMM | EMM-REGISTERED | UE HAS BEEN ATTACHED TO THE LTE NETWORK AND AN IP ADDRESS HAS BEEN ASSIGNED TO THE UE. AN EPS BEARER HAS BEEN ESTABLISHED. THE MME KNOWS THE CURRENT LOCATION OF THE UE WITH AN ACCURACY OF A CELL OR, AT LEAST, A TRACKING AREA |
| ECM | ECM-IDLE | NO NAS SIGNALING CONNECTION (ECM CONNECTION) ESTABLISHED YET. UE HAS NOT BEEN ASSIGNED PHYSICAL RESOURCES, I.E. RADIO RESOURCES (SRB/DRB) AND NETWORK RESOURCES (S1 BEARER/S1 SIGNALLING CONNECTION) YET. |
| ECM | ECM-CONNECTED | NAS SIGNALLING CONNECTION (ECM CONNECTION) IS ESTABLISHED. UE HAS BEEN ASSIGNED PHYSICAL RESOURCES, I.E. RADIO RESOURCES (SRB/DRB) AND NETWORK RESOURCES (S1 BEARER/S1 SIGNALING CONNECTION). |
| RRC | RRC-IDLE | NO RRC CONNECTION IS ESTABLISHED YET. |
| RRC | RRC-CONNECTED | RRC CONNECTION HAS BEEN ESTABLISHED |

FIG 3

| Case | State | User Experience |
|---|---|---|
| A | EMM-DEREGISTERED +ECM-IDLE +RRC-IDLE | • WHEN A UE IS SWITCHED ON FOR THE FIRST TIME AFTER SUBSCRIPTION<br>• WHEN A UE IS SWITCHED ON AFTER STAYING OFF FOR A LONG TIME<br>• NO UE CONTEXT IN THE LTE NETWORK |
| B | EMM-DEREGISTERED +ECM-IDLE +RRC-IDLE | • WHEN A UE IS SWITCHED ON WITHIN A CERTAIN PERIOD OF TIME AFTER BEING TURNED OFF<br>• WHEN ECM CONNECTION IS LOST DURING COMMUNICATION DUE TO RADIO LINK FAILURE<br>• SOME UE CONTEXT FROM THE LAST ATTACH CAN STILL BE STORED IN THE NETWORK (e.g. TO AVOID RUNNING AN AKA PROCEDURE DURING EVERY ATTACH PROCEDURE |
| C | EMM-REGISTERED +ECM-CONNECTED +RRC-CONNECTED | • WHEN A UE IS ATTACHED TO THE NETWORK (AN MME) AND IS USING SERVICES (e.g. INTERNET, VoD, LIVE TV, etc.)<br>• THE MOBILITY OF A UE IS HANDLED BY A HANDOVER PROCEDURE |
| D | EMM-REGISTERED +ECM-IDLE +RRC-IDLE | • WHEN A UE IS ATTACHED TO THE NETWORK (AN MME), BUT NOT USING ANY SERVICE<br>• THE MOBILITY OF THE UE IS HANDLED BY A CELL RESELECTION PROCEDURE |

FIG 7

Incoming message:

| Originating IP ADDR | | | | Originating Port | Destination Port |
|---|---|---|---|---|---|
| 10 | 10 | 25 | 51 | 18331 | 18447 |

Valid Template:

| Originating IP ADDR | | | | Originating Port | Destination Port |
|---|---|---|---|---|---|
| 10 | 10 | 25 | 51 | 18331 | 18447 |

FIG 8

Incoming message:

| Originating IP ADDR | | | | Originating Port | Destination Port |
|---|---|---|---|---|---|
| 10 | 10 | 25 | 51 | 227 | 18447 |

Valid Template:

| Originating IP ADDR | | | | Originating Port | Destination Port |
|---|---|---|---|---|---|
| 10 | 10 | 25 | 51 | 18331 | 18447 |

FIG 9

Incoming message:

| Originating IP ADDR | | | | Originating Port | Destination Port | Cryptographic Key | | | | | | | |
|---|---|---|---|---|---|---|---|---|---|---|---|---|---|
| 10 | 10 | 25 | 51 | 227 | 18447 | 01 | 23 | 45 | 67 | 89 | ab | cd | ef | ab | 89 | 67 | 45 | 23 | 01 |

Valid Template:

| Originating IP ADDR | | | | Originating Port | Destination Port | Cryptographic Key | | | | | | | |
|---|---|---|---|---|---|---|---|---|---|---|---|---|---|
| 10 | 10 | 25 | 51 | 227 | 18447 | 01 | 23 | 45 | 67 | 89 | ab | cd | ef | ab | 89 | 67 | 45 | 23 | 01 |

FIG 10

Incoming message:

| Originating IP Addr | | | | Originating Port | Destination Port | Match Message | | | | | | | |
|---|---|---|---|---|---|---|---|---|---|---|---|---|---|
| 10 | 10 | 25 | 51 | 227 | 18447 | 01 | 23 | 45 | 67 | 89 | ab | cd | ef | ef | 45 | 23 | 01 |

Valid Template:

| Originating IP Addr | | | | Originating Port | Destination Port | Match Message | | | | | | | |
|---|---|---|---|---|---|---|---|---|---|---|---|---|---|
| 10 | 10 | 25 | 51 | 227 | 18447 | 01 | 23 | 45 | 67 | 89 | ab | cd | ef | ef | 45 | 23 | 01 |

Ignore Mask:

| Originating IP Addr | | | | Originating Port | Destination Port | Match Message | | | | | | | |
|---|---|---|---|---|---|---|---|---|---|---|---|---|---|
| 0xff | 0xff | 0xff | 00 | 0xffff | 0xffff | 0xff | 0xff | 0xff | 0xff | 0xff | 0xff | 0xff | 00 | 00 | 00 | 00 | 00 |

FIG 11

Incoming message:

| Originating IP Addr | | | | Originating Port | Destination Port | Match Message | | | | | | | | |
|---|---|---|---|---|---|---|---|---|---|---|---|---|---|---|
| 10 | 10 | 25 | 51 | 227 | 18447 | 01 | 23 | 45 | 67 | 89 | ab | cd | ef | cd | ab | 89 | 67 | 45 | 23 | 01 |

Valid Template 1:

| Originating IP Addr | | | | Originating Port | Destination Port | Match Message | | | | | | | | | | | | | | |
|---|---|---|---|---|---|---|---|---|---|---|---|---|---|---|---|---|---|---|---|---|
| 10 | 10 | 25 | 51 | 227 | 18447 | 01 | 23 | 45 | 67 | 89 | ab | cd | ef | cd | ab | 89 | 67 | 45 | 23 | 01 |

Ignore Mask:

| Originating IP Addr | | | | Originating Port | Destination Port | Match Message | | | | | | | | | | | | | | |
|---|---|---|---|---|---|---|---|---|---|---|---|---|---|---|---|---|---|---|---|---|
| 0xff | 0xff | 0xff | 0xff | 0xffff | 0xffff | 0xff | 0xff | 0xff | 0xff | 0xff | 0xff | 0xff | 0xff | 0xff | 0xff | 0xff | 0xff | 0xff | 0xff | 0xff |

Valid Template 2:

| Originating IP Addr | | | | Originating Port | Destination Port | Match Message | | | | | | | | | | | | | | |
|---|---|---|---|---|---|---|---|---|---|---|---|---|---|---|---|---|---|---|---|---|
| 10 | 30 | 121 | 121 | 18333 | 18447 | 22 | 33 | 44 | 55 | 66 | 77 | 88 | 99 | aa | bb | cc | dd | ee | ff | 11 | 22 |

Ignore Mask:

| Originating IP Addr | | | | Originating Port | Destination Port | Match Message | | | | | | | | | | | | | | |
|---|---|---|---|---|---|---|---|---|---|---|---|---|---|---|---|---|---|---|---|---|
| 0xff | 0xff | 0xff | 00 | 0xffff | 0xffff | 0xff | 0xff | 0xff | 0xff | 0xff | 0xff | 0xff | 00 | 00 | 00 | 00 | 00 | 00 | 00 | 00 |

Valid Template 3:

| Originating IP Addr | | | | Originating Port | Destination Port | Match Message | | | | | | | | | | | | | | |
|---|---|---|---|---|---|---|---|---|---|---|---|---|---|---|---|---|---|---|---|---|
| 10 | 10 | 25 | 51 | 227 | 18447 | 01 | 23 | 45 | 67 | 89 | ab | cd | ef | cd | ab | 89 | 67 | 45 | 23 | 01 |

Ignore Mask:

| Originating IP Addr | | | | Originating Port | Destination Port | Match Message | | | | | | | | | | | | | | |
|---|---|---|---|---|---|---|---|---|---|---|---|---|---|---|---|---|---|---|---|---|
| 00 | 00 | 00 | 00 | 227 | 18447 | 0xff | 0xff | 0xff | 0xff | 0xff | 0xff | 0xff | 0xff | 0xff | 0xff | 0xff | 0xff | 0xff | 0xff | 0xff |

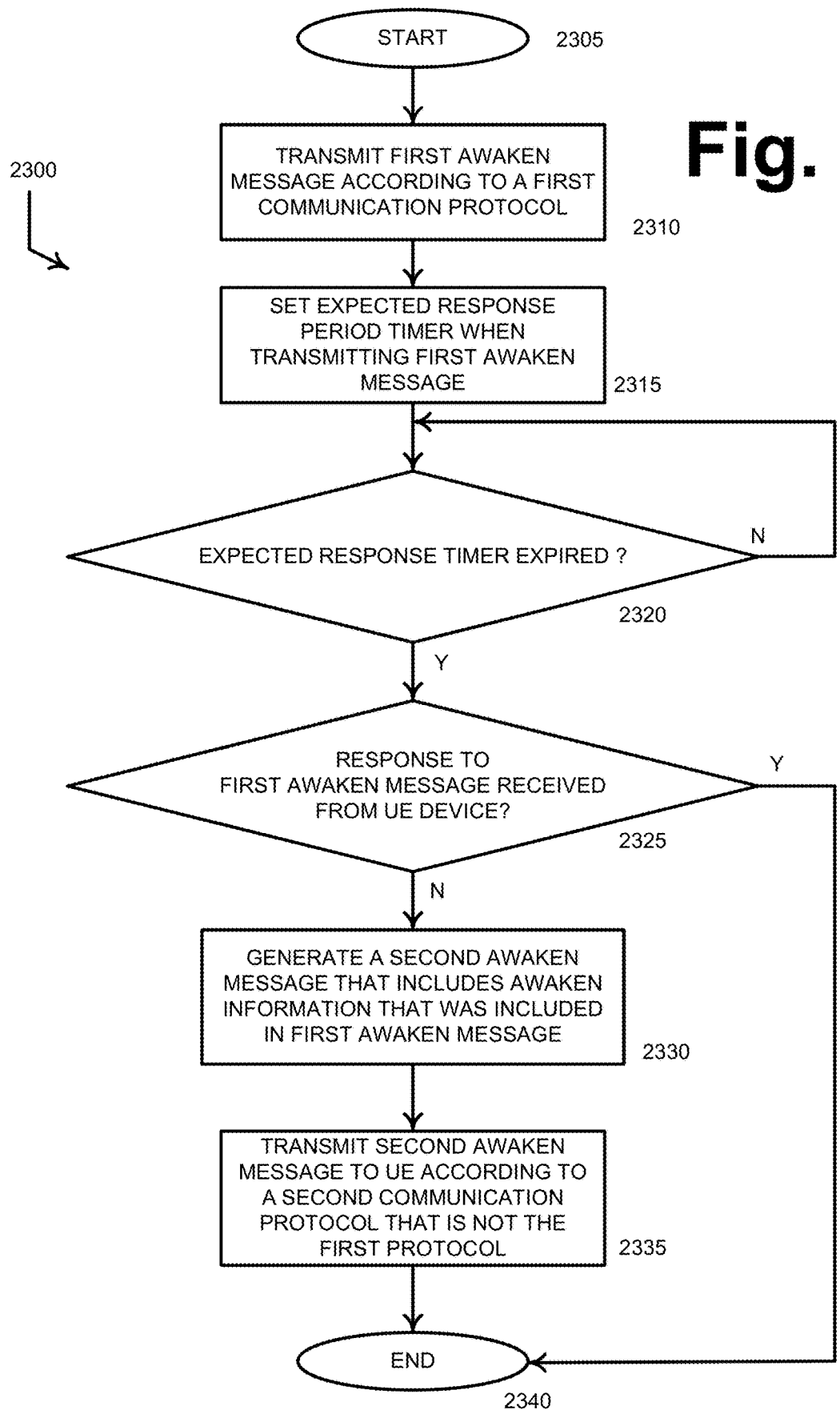

METHOD AND SYSTEM FOR FOR LOW POWER INTERNETWORK COMMUNICATION WITH MACHINE DEVICES

CROSS REFERENCE TO RELATED APPLICATION

This application claims priority under 35 U.S.C. 120 to, and is a continuation in part of, U.S. patent application Ser. No. 15/700,645 entitled "Method and system for low power internetwork communication with machine devices," which was filed Sep. 11, 2017, and which application, and this application, claim priority under 35 U.S.C. 119(e) to U.S. provisional patent application No. 62/393,988 entitled "Method and system for low power internetwork communication with machine devices," which was filed Sep. 13, 2016, both of which previously filed applications are incorporated herein by reference in their entireties.

FIELD

The field relates, generally, to Internet of Things systems and devices and, more particularly, to a system and method for delivering, and determining whether to act upon, messages, notifications, and inquiries to Wireless Wide Area Network ("WWAN") connected devices.

BACKGROUND

The Internet of Things ("IOT") is a recent development in which everyday objects have connectivity to data networks allowing them to send and receive data to other devices or systems. The connectivity enables the devices to achieve greater value and service by exchanging data with other systems, servers, and controllers. Sometimes this connectivity is used for remotely monitoring and controlling the connected device. IOT systems generally refer to the integrated use of telecommunications devices in embedded systems for transmitting, receiving, controlling, remotely storing and processing information. More generally, IOT may refer to smart devices sending, receiving, and storing information via telecommunication devices over a public communication network such as the World Wide Web ("WWW").

Other than the convergence of telecommunications and information processing, the term IOT may also refer to automation of various processes relating to the controlling and managing remote devices and systems. For example, in a scenario where an IOT system includes multiple food or beverage vending machines, the IOT system can report the inventory status of remote vending machines, operate e-payment systems that facilitate purchase of items from the vending machine, update content to be displayed on the exterior of one of IOT vending machines, and report interior temperature of one or more of the vending machines to provide an enhanced experience for the customers. In another scenario, an IOT system can allow a homeowner to remotely monitor and control the heating and air conditioning systems utilizing a smart thermostat while communicating over a communication network with one or more centralized servers to intelligently manage energy efficiency and to process consolidated energy usage reports. This IOT system may also synchronize the energy usage with other nearby systems to smooth out localized energy usage peaks, thus lowering overall peak energy demand on public utilities such as electricity and natural gas. In other aspects, the homeowners IOT system may monitor weather conditions and synchronize water usage for non-essential activities such as pool water replenishment and landscape watering.

An IOT device may be connected to a larger network, for example the Internet, using an ever-expanding number of methods. Early connected devices were networked with each other using proprietary localized networks created using multi-drop serial networks or simple non-standardized wireless networks. Those devices generally communicated with local gateways or controllers and were rarely remotely operable. As wide area networks were established, creative ideas drove the concept of connecting and controlling devices beyond the reach of the local network. As new technologies drive down costs of embedded electronics, sensors, and network connectivity, interconnection of devices and systems becomes more common.

Another major development that has contributed to the expansion of the IOT is the widespread rollout of centralized "cloud computing" services. Cloud computing allows application software to be operated using centralized, sometimes virtualized, Internet connected services. The foundation of cloud computing is based on the broader concept of shared services and a converged infrastructure. Cloud computing, which some may generally refer to as the use of computer resources that are distributed in 'the cloud,' relies on the sharing of resources and the economies of scale to deliver computing services. Combining the capabilities of the low cost, emerging, and connected smart devices with the expanse of connected cloud computing environments has created a technological opportunity to develop innovative solutions that will enhance automation in nearly every aspect of life.

Early Internet connected devices required complicated and expensive gateways to establish the Internet Protocol ("IP") connectivity. In the early days of the IOT, Ethernet, the primary physical connectivity medium, required expensive and power hungry hardware. The software stacks to implement IP were large and complicated and not easily ported to hardware systems unless the hardware included significant processing power and memory. Many of those IP stacks required an advanced operating system that further drove the hardware complexity. Over the last few years, micro computing and memory technologies have advanced to the point where a full operating system can be ported to very small and cost effective platforms. Some of the new single-chip micro computing platforms that have been introduced over the last five years are powerful enough to include an IP stack, real-time operating system, and sensor management to support an advanced smart device.

Advances in the various physical layer communication devices and technologies have also encouraged the deployment of connected devices. For example, Wi-Fi is a wireless local area network ("WLAN") computer networking technology that allows electronic devices to connect directly to the Internet thru a Wi-Fi wireless access point ("WAP"). Wi-Fi networks typically operate using low power transmitters on unlicensed spectrum at either 2.4 GHz or 5 GHz. The specifications for Wi-Fi networks are based upon IEEE 802.11 standards. Although the name "IOT" infers a direct connection to the Internet, in many cases the direct connection is using a medium and technology that is not directly IP. The reasons for selecting a different connection type are many.

Other recently developed technologies that are driving the IOT include ZigBee, Z-wave and of course the various Wireless Wide Area Network ("WWAN") technologies such as GSM, UMTS, and LTE. WWAN technologies differ from WLAN technologies by using different spectrum, protocols, security and authentication systems and the coverage area of a WWAN is typically much larger. WWAN wireless networks are usually operated by mobile telecommunications (or cellular) operators using licensed spectrum. The services may be offered regionally, nationally or globally.

The connecting of devices to the Internet using various WWAN technologies is older than the term "Internet of Things." Early non-cellular technologies included Mobitex, DataTAC, and ReFLEX. Each was a purpose-built data-network that supported narrow-band two-way data connectivity. Although the networks existed before the wide acceptance of what we now know of as the Internet, they operated on private wide area networks. As the wireless cellular networks became more refined, systems emerged to leverage the assets of cellular operators. In the United States, Cellular Digital Packet Data ("CDPD") networks were developed and deployed using the unused bandwidth of the AMPS analog mobile networks. While CDPD supported speeds up to 19.2 K bits per second, and was significantly faster than Mobitex, DataTAC, or ReFLEX, it could not compete against the slower, less expensive and more flexible Mobitex, DataTAC, and ReFLEX networks.

Outside the US, GSM networks, a second-generation ("2G") technology, were being deployed using digital wireless technology as opposed to the analog networks of AMPS. Being digital, these 2G networks could inherently carry data communications but the connectivity was not usually to a wide area network like the Internet, but to local modem interworking-function platforms that placed an outgoing analog dial-up modem call over the fundamentally analog public switched telephone network ("PSTN"), bridging the digital GSM world with the analog PSTN world. This was called circuit-switched data ("CSD"). The over-arching premise of the CSD solutions depended upon on the wireless mobile communication device initiating the outgoing connection.

The wireless networks in the United States began to deploy digital wireless technology, principally for voice, in more than a few markets by the mid- to late-1990's. These systems also included a modem interworking-function or CSD that depended on the mobile device to initiate the outgoing interconnection to its destination. As the Internet became popular in the late 1990's, the modems were removed from interworking-function, allowing devices to connect to the Internet directly without going thru an analog modem to the PSTN to reach the Internet. Again, it should be noted that these CSD-connected devices, which could perhaps be considered as the first IOT devices, could initiate outgoing data connections, but could not easily receive incoming data connections from the Internet.

In the early 2000's, the GSM network operators began to deploy General Packet Radio Service ("GPRS") technology in their wireless networks. GPRS is a packet oriented mobile data service for GSM 2G and third generation ("3G") networks. Instead of "dialing" thru a CSD connection, GPRS devices access the terrestrial packet network using an access point name ("APN"), username and password. Although the APN may specify access to the public Internet, it may also specify access and connection to a defined endpoint, for example, to a private enterprise network. This was the first system to provide worldwide mobile access to the Internet. As above, it should be noted that these WWAN connected devices initiated the outgoing connection to the external packet networks.

The wireless industry refers to incoming wireless device connections, as mobile terminated ("MT") voice or data connections. MT wireless devices and connections are considered mobile, without regard to the movability of the device. The significant advantage of the early packet data networks such as Mobitex, DataTAC, and ReFLEX was their ability to accept MT data connections. Mobitex, DataTAC, and ReFLEX networks were principally designed to support two-way paging-like features, including portable wireless devices carried on one's person like a one-way pager and as such, these networks supported devices that firstly supported incoming MT data. For the cellular wireless and GPRS networks, including Universal Mobile Telephone Service ("UMTS") networks, data transport was an afterthought (or late addition) and receiving incoming data connections was not generally supported by the networks for the vast number of devices that operated or will operate on the wireless networks. Short Message Service ("SMS") connectivity was one of the first types of MT data supported by the vast majority of wireless mobile devices that were created first and foremost for voice services.

The methods of receiving, accepting, and acting upon incoming data connections are many. Almost all current methods are very slow or very expensive in terms of network resources. One method currently used almost exclusively for IOT devices involves sending an SMS message to the remote wireless device and once received, the remote wireless device initiates an outgoing connection to the requesting server. This method may be referred to as an 'SMS Shoulder Tap.' Another method supported by some IOT devices, but significantly less popular, is to place an MT voice call to the IOT device using its Mobile Station International Subscriber Directory Number ("MSISDN"). The data device does not accept the MT voice call, but instead uses this incoming call as a triggering event and subsequently initiates an outgoing IP connection to the requesting server. Both methods described are problematic and involve significant latency and require the initiating server to interface to disparate systems.

Modern WWAN IoT systems are deployed in many different locations. Many of those devices are deployed in locations where the device may be powered by standard commercial utility power sources. However, many IoT applications that do have access to commercial utility power also have access to either wired or WiFi wireless Internet connections, driving the significant percentage of WWAN IoT applications specifically to those requiring both mobility and non-utility power applications. Even heavy equipment and automotive telematics applications have power limitations; not necessarily while the engine is running, but more specifically while the equipment or vehicle is idle (i.e., the vehicle's engine is not spinning the alternator. Thus, any device receiving power from the vehicle is depleting charge from a battery of the vehicle). Remote control applications in telematics applications as well as solar or battery powered data acquisition equipment require very low standby operation power so that the device can receive remote commands for extended periods without overly large standby batteries.

U.S. patent application Ser. No. 15/093,560 ("'560") filed Apr. 7, 2016, which is incorporated by reference herein, discloses methods to efficiently route traffic and signals to mobile devices using 3GPP standard methods coupled with the previously disclosed Internet gateway(s). Although '560 discusses solutions to certain network signaling and traffic routing problems and addresses external Internet security issues, '560 does not address device power management and security aspects as disclosed herein.

With the large number of IOT devices and with the user expectation of Internet-like responses from those devices, and the need for remotely controlling WWAN connected devices, it is desirable to have a reliable and high-speed method to re-establish a data session with a device that may have already ended a session, but that remains attached. It is desirable to minimize the power consumed by a device that remains in a standby state, while maintaining the device in a state where it can receive incoming data packets necessary to respond to remote control or remote data requests.

SUMMARY

In accordance with one or more of the embodiments, this disclosure presents a method for managing a wirelessly connected mobile device while remaining connected in an attached state in a 3G network, or while EMM-registered in a 4G LTE network. A method and system is disclosed herein for managing a remote connection re-establishment solution that minimizes total mobile device power consumption without unnecessarily delaying connection time. Further, a method and system is disclosed herein for securely managing the data session reestablishment process without unnecessary power draining events that could drain a battery in unsuccessful or fraudulent connection attempts.

WWAN devices have numerous attachment states, with some states permitting the device itself to communicate over an IP network to some predetermined IP endpoint in the wireless network using default or dedicated bearers. That endpoint is usually part of, or managed by, a sophisticated router, a GGSN in a GSM/UMTS network, or a Packet Gateway [PGW] in an LTE network. The GGSN/PGW acts as a firewall when the device connects to the Internet and it operates like a gateway when the device connects to a defined private network, for example, an enterprise network operated by a third party enterprise specifically for supporting the connectivity of the IOT device to the enterprise's own private servers. In the case of LTE devices, any time a WWAN device is attached to the network it has a default bearer established between the device and the network, and with the proper network implementation and configuration messages can be pushed to the WWAN device regardless of whether the device itself is prepared to receive the message.

WWAN mobile platforms for LTE or UMTS generally have a modular architecture for wireless communications and user applications. Usually the platform contains a modem subsystem comprising a hardware sub-system and a layered software sub-system. Additionally, the mobile platform usually includes either a co-located third party application processor or preferably a multi-processor system-on-a-chip [MPSOC] where one of the processors is dedicated to the modem function and handles a reduced set of functionalities, such as providing access to a mobile communications network. A second, third or subsequent processor core may be dedicated to provide higher layer or level communications functionality, for example the implementation of an IP protocol, and multimedia and user interface and application processing.

Those skilled in the art should quickly recognize that for a mobile communications handset or smartphone to function properly, the subsystem of the device serving as the interface to the mobile communication network (e.g., modem) must remain powered unless it is managed in conjunction with functionality in the mobile communications network itself. One example of this management is the Discontinuous Receive [DRX] function of LTE as described in 3GPP TS 36.304. In this mode, the baseband processing may be temporarily suspended for a period of time to allow the mobile device to save power. In order for the baseband processor to be active for reception of incoming signaling or messaging, the baseband processor and serving node of the network coordinate the periods of time when the baseband processor "sleeps," such that signaling occurs during the periods of the baseband processor being active.

Although the above examples specifically are related to mobile communications devices implemented as smartphones where small batteries and long life are obviously critical, the above examples can equally apply to Internet of Things device connected to a mobile communications network. Early IoT devices used SOCs created specifically for handsets because the volume was not large enough to justify the development of custom SOCs for IoT. Leveraging the power management features of the handset SOCs for IoT devices is equally important in most cases. This disclosure teaches a method to minimize power consumption of the mobile communications device by leveraging the baseband processor, or baseband processing subsystem on a SOC, to assist in the power management of the entire mobile communications device by filtering incoming network messages and packets, and deciding whether to act upon the received incoming messages, in addition to its job of interfacing to the wireless communications network, while the power to applications processors are off and their clocks are stopped or the power is applied to the applications processor(s), but the clocks are operated at a very slow power saving rate.

Aspects include, a system, or a wireless communication device that includes one or more electronic systems, that includes a first processor portion. The first processor portion may be a microprocessor, a system on a chip, or other digital data processor circuitry. The first processor may be a baseband processor, a wireless communication modem processor, or a processor that may not have the capability to perform sophisticated application processing. The first processor may be configured to evaluate a received message to determine whether to provide an instruction to transition from a low power state. The message may be received from radio circuitry of a device that includes the first processor, is associated with the first processor, or that is coupled with the first processor. The instruction to transition from a low power state may be an instruction for a component that is part of the system, or wireless communication device that include the first processor, or for another portion a chip that includes the first processor portion, to transition from a low power state, which may be a 'sleep' state.

The first processor portion is further configured to evaluate by the first processor portion of the received message, which evaluation may include comparing at least a one aspect of the received message to at least one transition from low power state criterion. The at least one transition from low power state criterion may be one of a plurality of criteria, or may be a single criterion, the satisfying of any one of which may be used as a basis to generate a transition from low power state instruction.

The first processor may be further configured to generate a transition from low power state instruction if the at least one aspect of the received message satisfies the at least one transition from low power state criterion; and to provide the transition from low power state instruction, typically to a second processor portion, which may be part of a wireless communication device that includes the first processor, that is part of a system on a chip that includes the first processor, portion, or that is another component that is configured to cooperate with the first processor portion to operate certain aspects of a wireless communication device, such as running applications that typically process data that may be transmitted over a data connection when the wireless communication device is not in an ECM Idle state or in an RRC idle state.

In an aspect, the second processor portion may be configured to provide the at least one transition from low power state criterion. The second processor portion may be configured to provide the at least one transition from low power state criterion before transitioning to the low power state. The at least one transition from low power state criterion may be a template that includes criterion, or criteria, for determining whether to generate an instruction to cause the second processor portion to wake up. Satisfaction of the at least one transition from low power state criterion typically involves determining that the received message includes, or conveys, more information than the mere fact that an incoming message was received by the first processor portion. The template may include values, or one or more ranges of values, that information in the incoming message matches, or falls within (typically if the criteria is a range of value), for a determination of meeting, complying with, matching, or otherwise satisfying the at least one transition from low power state criterion.

The at least one transition from low power state criterion may include a layer 2 physical address, a layer 3 logical address, one or more port identifiers (initiating or destination), cryptographic information, a time stamp, a time-based value. The time-based value may be a value derived from, or calculated based on, a time stamp such that when the information received in the incoming message, which may include the time stamp that was used to generate the time-based value at a device that generated the message, may be used to calculate a time-based value at the first processor portion. The first processor portion can determine whether the calculated time-based value that it calculates (typically using an algorithm that the sending device used to generate the time-based value) matches the time based value received in the message, and the first processor may also determine that the time-stamp that may be included in the received message falls within a predetermined range of the current time at the wireless device that includes the first processor portion. In such a scenario, the current time of the first processor portion, or a device in which it operates, may be considered an at least one transition from low power state criterion; the algorithm to calculate the time-based value based on a time stamp received in the incoming message may be considered as an at least one transition from low power state criterion.

The at least one transition from low power state criterion may include a physical address.

The received message is received via a default bearer. When the second processor portion of a wireless communication is in a low power state the wireless communication device that includes the second and first processor portions would typically be in an ECM Idle and RCC idle mode, during which a dedicated bearer typically would not be established for the wireless communication device.

In an aspect, the received message may be acted on (i.e., the first processor portion determines that an at least one transition from low power state criterion has been satisfied) if it was transmitted during a DRX cycle that was initiated by an MME, SGW, or PGW. In another aspect, the first processor portion may not act on a received message if the message was initiated during a DRX cycle by an eNodeB. This aspect may provide the advantage that a second processor of a wireless machine device that does not need to respond to emergency messages, such as may be related to a storm, a missing child, etc., does not need to transition from a low power state unless a message is directed to it (i.e., door unlock message to a particular vehicle or message requesting sensor information from one or more sensors of a particular machine device), as compared to a second processor of a UE such as a smart phone that may need to perform application processing related to a missing child Amber Alert that may be broadcast from an eNodeB to all wireless devices that the eNodeB's signal can reach. Messages such as storm warnings or Amber Alerts that are broadcast from an eNodeB during a DRX paging cycle may be referred to having been broadcast during a broadcast DRX cycle. In an aspect, the first processor may determine that the at least one transition from low power state criterion is not met during a DRX cycle unless the first processor determines that the received message was generated using non-access stratum signaling. Since non access stratum signaling typically is not used with, or typically does not operate with, a wireless communication device that is in a state of ECM Idle and RRC idle, a flag, or bit, may be set to a predetermined NAS signaling indication value to indicate to the receiving first processor, by comparing the NAS signaling indication value to a transition from low power state criterion, that the second processor should transition from a low power state and process data that may arrive, perhaps over a dedicated bearer, or perhaps over the existing best effort default bearer to the wireless communication device and the first processor portion.

In an aspect, the first processor portion and the second processor portion are a baseband processor portion and an application processor portion, respectively.

In an aspect, the first and second processor portions are parts of a single user device, such as a wireless communication device, that may be a smart phone, a tablet, a medical device in a hospital, a vehicle telematics device, a vending machine, and the like.

In an aspect, the first and second processor portions are parts of a single processor chip.

In an aspect, the first and second processor portions are separate processor chips coupled to shared circuitry.

In an aspect, the transition from low power state criterion is stored in a memory shared by, and accessible by, the first processor portion and the second processor portion.

In an aspect, the first processor further evaluates the received message to determine, based on the at least one transition from low power state criterion, whether the received message relates to performing a function that requires that the second processor portion transition from a low power state.

In another aspect, a first processor portion of a wireless communication device may perform a method, which may comprise determining whether to provide an instruction to perform a function that requires a transition from a low power state, wherein the determining includes comparing at least a one aspect of the received message to at least one transition from low power state criterion. The method may also comprise generating a transition from low power state instruction if the at least one aspect of the received message satisfies the at least one transition from low power state criterion and providing the transition from low power state instruction.

In an aspect, the steps of the method may be performed by a first processor portion, and the transition from low power state instruction may be provided to a second processor portion.

In an aspect, the transition from low power state criterion may be stored in a shared data store that is accessible by the first processor portion and the second processor portion. In an aspect the transition from low power state criterion may be a cryptographic key, a time-based value, or other information that may be unique to an instruction that would be received in a message from a device that is authorized to cause the first processor portion to awaken the second processor portion.

In an aspect, the transition from low power state criterion includes awaken information that the second processor portion generated before transitioning to a low power state. An example is that the second processor, or application processor, might generate a new wake-up template, for example a template that only allows the device to transition from low power state in the event of a message from a specific server based on an IP address or some other unique identifier. The first processor may have a wake-up reason mask that might include things like firmware update, location determination request, fuel level request, battery charge status request, pre-trip conditioning request, etc. The second processor might limit wake-up to a specific reason, for example, to location determination request by setting a wake-up mask to block other reasons and allowing a second processor wake-up based only on location determination. This mask may be loaded into the first processor prior to the second processor portion transitioning to a low power state.

In an aspect, the second processor portion may generate a transition from low power state criterion, or criteria, based on a shared value it receives in a message, such as from a computer server that is associated with a wireless mobile network or from a computer server that may be coupled to a packet core network and that may provide a platform for cooperating with a machine device having the first and second processor portions in performing machine device operations. For example, a server remote from a machine device, which machine device includes the first and second processor portions, may generate, or obtain, a value such as a date, a random number, or other value, which value may be a one-time value, and provide the value/one-time value to an algorithm that also has as an input a stored secret value, such as a cryptographic key, and generate an output, which may be referred to as a derived key. The server may send, or share, the value/one-time value to the machine device, which may have the secret value, or a complement to the secret value, stored in a memory that the first or second processor portion can access. The machine device may store, or have stored, the secret value, secret key, or complement to the secret key/value in a SIM card, or SIM profile. The first or second processor portion may evaluate the received value/one-time value, which may be referred to as a shared value, using the same algorithm and secret value, or complement of the secret value, as used by the server to derive the derived key, or derived value. The first or second processor portion of the machine device may then provide the derived value, or derived key, as a transition from low power state criterion before going into a low power state. A derived key, or derived value, may have a predetermined life span (e.g., one day, one week, one year, etc.). Alternatively, a derived key/derived value may have a one-time-use life span. In the one-time-use lifespan scenario, the server may derive a new/different derived key/value and share with the machine device the value/one-time value used to generate/derive the derived key/value during each period that the second processor portion is not in a low power state, and either the first processor, the second processor, or SIM may generate and provide the transition from low power state criterion/criteria based on the received shared value. The first or second processor portion, or the SIM, may provide the generated derived value before the second processor portion enters a low power state based on the received shared value, or the entering of a low power state by the second processor portion may trigger the initiating of the process at the server to generate the shared value and generating of the derived key value, and the receiving of the shared value thereafter may trigger either the first or second processor, or the SIM, in generating/deriving the derived value/key and storing it to a memory to be used as a current transition from low power state criterion/criteria as opposed to a previous or already-used criterion/criteria (i.e., a criterion already used in a comparison to a derived value/awaken information included in an awaken message). A current transition from low power state criterion/criteria is for use for future comparison to a received derived value, which may be part of, or totally compose, an awaken message received from the server.

In an aspect, the shared secret may be a cryptographic key, which may be a cryptographic key stored in a SIM, SIM profile, or other memory of a UE device and also stored in a data store that uniquely associates the cryptographic key with the UE device, which data store is only accessible by the server. The server may use the cryptographic key to encrypt the shared value before transmitting the shared value to the UE device, which can decrypt the encrypted shared value using the cryptographic key stored in the SIM, SIM profile, or other memory of the UE device. The UE device may use the cryptographic key to encrypt the shared value before transmitting the shared value to the server, which can decrypt the encrypted shared value using the cryptographic key that is uniquely associated with the sending UE and that is stored in the data store that only the server can access and retrieve the cryptographic key from. In an aspect, the server may reset an awake timer to a predetermined awake period associated with the UE device whenever a communication between the server and UE device is received by or transmitted by the server. The predetermined awake period may be a period having a value that is uniquely associated with each of a plurality of UE devices, for example each of a plurality of telematics UE devices managed by a telematics services provider's server that correspond to a fleet of vehicles managed by a telematics services provider. The predetermined awake period may be a period having a value that is uniquely associated with each of a group of a plurality of UE devices, for example a group of a plurality of telematics UE devices managed by a telematics services provider's server that correspond to a group of a fleet of vehicles. For example, one group of a fleet may be sedans managed by a manufacturers' telematics services provider, which may be an in-house telematics provider or a third-party telematics provider, and another group may be pickup trucks managed by a manufacturer's telematics services provider (the pickups' manufacturer may be the same manufacturer or a different manufacture than the manufacturer of the sedan group). The predetermined awake period value may be the same for the group of sedans' telematics UE devices and may be a different value for the group of pickups' telematics UE devices.

The predetermined awake period to which the awake timer at the server may be set may correspond to a predetermined awake period of a sleep timer at a given UE device. The predetermined awake period of the UE's sleep timer and the predetermined awake period of the awake timer at the server may be substantially the same value, may be exactly the same value, or may not be substantially the same value. The server may be programmed with, or may be able to access from a data store, the UE's awake period value. A UE device may be programmed with, or may be able to access from a data store, the server's awake period value. Linking the awake period to which the awake timer at the server device may be reset with the awake period to which the sleep timer at the UE device may be reset by resetting each timer to exactly the same value, or to substantially the same value, upon a communication received from, or transmitted to, the other device may facilitate the server in coordinating the transmitting of an awake message to a UE device when the UE device is likely in a low power state and when a message (other than an awaken message) needs to be transmitted to, and processed by, the UE device. (Variations between the value for the respective predetermined awake periods at the server and UE device may be made, or adjusted, to account for communication network delays or transmit time of a communication from one device to the other.) Such linking may facilitate the server in not sending an awaken message from the server to a UE device when a message (other than an awaken message) needs to be transmitted but when the UE device is likely not in a low power state. For example, if the predetermined awake period at the server has not counted down to zero when the server needs to send a message (other than an awaken message) to the UE device, transmitting an awaken message to the UE should be unnecessary because the UE device should not be asleep—since the awake timer at the server and sleep timer at the UE device are reset substantially simultaneously to substantially the same value, or to exactly the same value, if the predetermined awake period of the awake timer at the server has not counted down to zero (i.e., hasn't expired) the predetermined awake period of the sleep timer at the UE device also hasn't counted down to zero and thus the UE device should not be asleep (i.e., in a low power mode or state).

For example, when the server, such as a telematics server for example, transmits a message to a UE, which may be a smart phone, a telematics device in a vehicle, or the like, even if the UE device is already 'awake,' the server may reset the awake time to the predetermined awake period. The predetermined awake time period may be arbitrarily determined by an operator of the server, for example a telematics operator whose telematics server manages a plurality of UE devices, according to an average period of inactivity of a UE device even while the UE device is in service (i.e., while a vehicle is operating on a trip or while a smart phone user is not asleep them self and is generally expecting the smartphone to be active). The predetermined awake time period may be the same value for all UE devices managed by the server, or the predetermined awake time period may be a unique value for one of, for each one of, or for more than one of the plurality of UE devices.

After resetting the awake timer, the server may generate awaken information derived from a shared value and a stored secret value, wherein only the server and a single UE device, remote from the server and managed by the server, can obtain the particular stored secret value (the particular stored secret value is unique to a given UE device), and may transmit the awaken information in an awaken message to the UE device when the server determines that the UE device is in a low-power state and should exit the low power state, for example to receive a message that needs to be delivered to the UE device (for example a message received by the server that is intended for delivery to the UE device or a message that the server may generate to send to the UE device) and based on the awake timer having expired, wherein the awaken information contained in an awaken message transmitted from the server to the UE is to be used by the UE device to exit the low power state when the awaken information matches a transition from low power state criterion. As an example, a telematics service operator's server may set the predetermined awake period for a given telematics vehicle device UE to ten minutes when it transmits a communication to the UE. If a message is received at, or generated by, the telematics server for forwarding to the UE five minutes later, the telematics server would transmit the message to the telematics UE and reset the awake timer to the predetermined awake period of ten minutes. However, if a message to be transmitted to a telematics UE device of a vehicle is received at the telematics server eleven minutes after a resetting of the awake timer to the predetermined awake period of ten minutes, the telematics server may transmit an awaken message that is generated based on a shared value that is shared with the UE device and based on a stored secret value that only the server and the UE have access to. When the telematics server transmits the awaken message to the vehicle telematics device, or other type of UE device, the telematics server may again reset the awake time to ten minutes. The resetting of the awake timer may occur substantially simultaneously with the transmitting of an awake message, the transmitting of another type of message, or the receiving of a message from a given UE device associated with the awake timer's predetermine awake period. It will be appreciated that the resetting of the awake timer may occur slightly before or slightly after the transmitting of an awake message, the transmitting of another type of message, or the receiving of a message from a given UE device, typically within a few milliseconds, but this time between the resetting of the awake timer and the transmitting of an awake message, the transmitting of another type of message, or the receiving of a message from a given UE device could be more than a few milliseconds and still be considered substantially simultaneously with the transmitting of an awake message, the transmitting of another type of message, or the receiving of a message from a given UE device. Examples of an incoming message, or a message that the server may generate, include messages from an initiating device, such as a user's smart phone, a tablet, a key fob, that request an action of the UE, or a machine coupled with the UE, such as a vehicle coupled to a telematics device via a communication bus of the vehicle or via a wireless link substantially local to the vehicle. Other examples of an incoming message, or a message that the server may generate, include messages from message requesting a download of a software update to the UE or to a machine coupled thereto (i.e., a module coupled to a communication bus of a vehicle), a message to check location information of UE, a message to check insurance-related information for an insurance provider server, a message to check vehicle diagnostic information for a telematics services provider's server, and the like.

In an aspect a computer device, such as a telematics server, a machine device services server, a component of a evolved packet core communication network, or the like, may perform a method that comprises receiving information that a second processor portion of a wireless machine device has transitioned to a low power state; transmitting a message to the wireless machine device that includes a first processor portion and the second processor portion; wherein the message includes awaken information for comparison to at least one transition from low power state criterion; wherein the at least one transition from low power state criterion is stored in a memory that may be shared between the first processor portion and the second processor portion; wherein the message includes an instruction to perform a function by the second processor portion; and wherein the message is intended to cause the first processor portion to cause the second processor portion to transition from a low power state when the awaken information matches the transition from the at least one low power state criterion.

In an aspect, the computer device that receives the information that the second processor portion of a wireless machine device has transitioned to a low power state may be one of: an MME, an S-GW, a P-GW, an HSS, an AAA, an ePDG, an ANDSF, a PCRF, an e-SMLC, a GMLC.

In an aspect, the awaken information includes a PLMN list identifier. In an aspect, the PLMN list identifier may identify a preferred PLMN list, which may be stored in the wireless communication, that lists a preferred order of mobile network operators for the wireless communication device to use for high-volume, high-bandwidth services, such as consumer services like audio and video streaming, that are not necessarily associated with a wireless mobile network that the first processor portion has established a current default bearer with.

In an aspect, the awaken information includes an identifier of a SIM profile of the machine device that is associated with machine-centric services and that is not associated with consumer-centric services. Examples of machine-centric services include typically low-volume, low bandwidth services that may include over-the-air software updates for a machine that the wireless communication device is coupled with, such as a vehicle, a vending machine, or a medical device, or software updates for the wireless communication device itself.

In an aspect, which may provide a fall-back, fail-over, or other type of back-up message delivery mechanism for delivery of an awaken message, or another type of message, a server sets an expected response timer to a predetermined expected response period when transmitting the awaken message to a UE device according to a first format and a first protocol, wherein the awaken message is a first awaken message. An awaken message may include awaken information derived from a shared value shared between the server and the UE device and derived from a stored secret value that only the server and the UE device can access.

Typically, the first format and first protocol may preferably be a datagram transmitted in a message according to a protocol such as User Datagram Protocol. An expected response may be a reply datagram from the UE device that the UE device has exited a low power state, or that it performed an action that was requested of it in an action request message sent to it from the server. The expected reply may be a message generated by the UE device received at the server, or received from another network device, indicative of the UE device exiting a low power state. Such a reply typically happens within two seconds, so the expected response period may be set to three seconds, although an operator of the server may select another value for the predetermined expected response period.

If the server does not receive a response in reply to the transmitting of an awaken message within the predetermined expected response period that follows the transmitting of the awaken message, or other type of message, the server may generate a second awaken message that includes the awaken information that was transmitted in the first awaken message and then the server may transmit the second awaken message to the UE device according to a second protocol that is different from the first protocol.

In an aspect, examples of the second protocol are: Short Message Service ("SMS"), Multimedia Messaging Service ("MMS"), Mobile Terminated Incoming Call ("MTIC"), Rich Communications Service ("RCS"), iMessage (a messaging protocol used by Apple® iPhone® devices), IP multimedia Subsystem ("IMS"), or Session Initiated Protocol ("SIP"). Other similar protocols that are different from the first protocol may be used.

In an aspect, the first awaken message is transmitted according to an IP data protocol that is not one of: Short Message Service ("SMS"), Multimedia Messaging Service ("MMS"), Mobile Terminated Incoming Call ("MTIC"), Rich Communications Service ("RCS"), iMessage (a messaging protocol used by Apple® iPhone® devices), IP multimedia Subsystem ("IMS"), or Session Initiated Protocol ("SIP").

In an aspect, the UE device evaluates the contents of a message received according to the second protocol to determine whether the contents thereof include awaken information to compare to a transition from low power state criterion. The UE devices may not perform any action based on contents of a message received according to the second protocol if the contents do not include awaken information. For example, if the second protocol is SMS, and the UE device receives an SMS message that contains contents that are unrelated to causing the UE device to transition from a low power state of operation to a higher power state or operation, (e.g., the contents of the SMS message are a text message), a first processor portion of the UE device may decline to instruct another portion of the UE device, such as an application processor, to exit a low power state. In another aspect, if the second-protocol message includes awaken information, the first processor still may not instruct the application processor, or other portion, to exit a low power state if the awaken information does not match a transition from low power state criterion stored in the UE device. In an aspect, if the second-protocol message includes awaken information may instruct the application processor, or other portion, to exit a low power state if the awaken information matches a transition from low power state criterion stored in the UE device.

BRIEF DESCRIPTION OF DRAWINGS

FIG. 1 illustrates a table that summarizes EMM, ECM and RRC states for an LTE wireless UE device.

FIG. 3 illustrates various states of an LTE device and the user experiences corresponding to each of those states.

FIG. 7 illustrates incoming message information that matches transition from low power criteria.

FIG. 8 illustrates incoming message information that does not match transition from low power criteria.

FIG. 9 illustrates comparing cryptographic information generated based on information in an incoming message to a transition from low power template.

FIG. 10 illustrates comparing information received in an incoming message to a transition from low power template mask that includes an ignore address range mask.

FIG. 11 illustrates an aspect where different information in different corresponding messages may satisfy transition from low power state criteria for different layers in a UE, or for more than one processor that may be in a low power state.

FIG. 23 illustrates a flow diagram of a method for implementing an alternative messaging fall-back aspect when a confirmation that a first awaken message transmitted according to a primary messaging protocol is not received.

DETAILED DESCRIPTION

Figure 2:
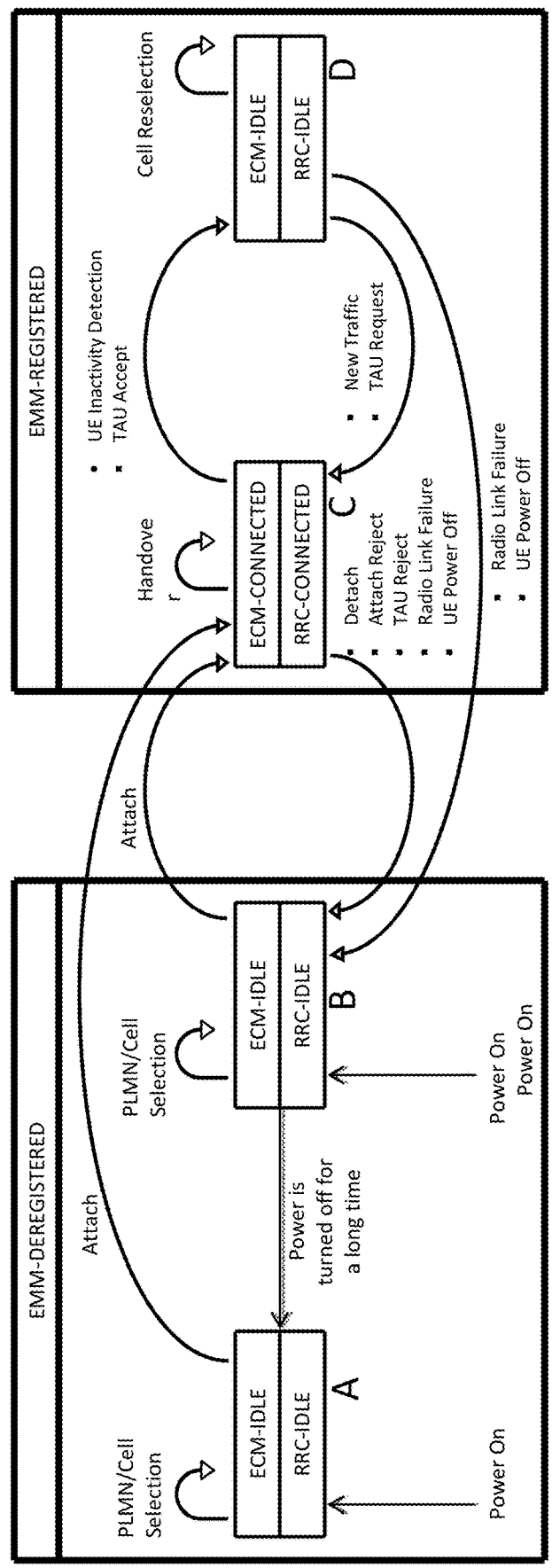
FIG. 2 illustrates a state table of an LTE device showing various EMM, ECM and RRC states

As a preliminary matter, it will be readily understood by those persons skilled in the art that the present invention is susceptible of broad utility and application. Many methods, embodiments, and adaptations of the present invention other than those herein described as well as many variations, modifications and equivalent arrangements, will be apparent from or reasonably suggested by the substance or scope of the present invention.

Accordingly, while the present invention has been described herein in detail in relation to preferred embodiments, it is to be understood that this disclosure is only illustrative and exemplary of the present invention and is made merely for the purposes of providing a full and enabling disclosure of the invention. The following disclosure is not intended nor is to be construed to limit the present invention or otherwise exclude any such other embodiments, adaptations, variations, modifications and equivalent arrangements, the present invention being limited only by the claims appended hereto and the equivalents thereof.

In the GPRS and LTE data worlds, an active data session is known as a packet data protocol ("PDP") context session or a Bearer Setup. As previously mentioned, a mobile device establishes a packet data session to a specific endpoint. The specific endpoint is a gateway/firewall to get to the broader public Internet or it may be to a gateway/firewall to an established enterprise IP connection. Generally speaking, a PDP context is established to a Gateway GPRS Support Node ("GGSN") for GSM and UMTS networks or, in the 4G/LTE network, an Evolved Packet System ("EPS") Bearer Setup is established to a Packet Data Network Gateway ("PGW").

For a UMTS or GSM device, the network data session is established with the PDP Context Activation procedure. But, before the PDP context can be established, a User Equipment ("UE") device must do an Attach procedure. The Attach procedure is used to alert the Serving GPRS Support Node ("SGSN") and subsequently the HLR/HSS that the UE has powered up. There is not much the UE can do after an Attach without requesting a PDP context. But, the UE is available to receive an SMS or a Network Initiated PDP Context. Currently there are not many operators supporting SMS over the packet network and almost no operators support Network Initiated PDP Context because there are not established methods to request the Serving GPRS Support Node ("SGSN") to generate a Network Initiated PDP Context without using a predefined public static IP address assigned to the given UE device.

Normally a UMTS or GSM device will complete the Attach procedure and immediately initiate a PDP Context Activation that will establish the data session and network tunnels, and allocate an IP address to the UE. The UE will retain the IP address as long as the device continues to transmit or receive data from the GGSN, but as soon as the data stops flowing, after predetermined inactivity timeout period, typically about an hour, the SGSN or GGSN can terminate the PDP context. The UE can also send a Deactivate PDP context to the SGSN and terminate the session at any time. Once the PDP Context is deactivated, as is the normal operation currently, the UE must reinitiate the PDP Context activation procedure.

For a LTE based system, there are two types of data session setups. The first is called a Default EPS Bearer. The second is the Dedicated EPS Bearer. The Default EPS Bearer is established as part of the Attach procedure. When a UE application needs to establish an application data service, a Dedicated EPS Bearer will need to be established. The LTE Attach/Default EPS Bearer is the equivalent of the UMTS Attach. One major difference is that the default bearer in LTE comes with an IP address where a UMTS or GSM Attach does not assign an IP address. The LTE Dedicated EPS Bearer setup is similar to the PDP Context Activation.

For UMTS or GSM, the IP address is not assigned until the UE initiates a PDP Context Activation. In LTE, the default bearer, and hence the IP address of the UE on the default bearer, both remain as long as the UE is attached. For UMTS or GSM, the IP address disappears with the loss of the PDP Context, which happens due to inactivity, typically after about an hour of inactivity. For LTE, the IP address remains as long as the device does not specifically detach from the network for one of several of reasons. For GSM/UMTS and LTE devices, the only way to maintain a PDP Context or dedicated bearer for application data is to continue to pass data between the UE and the GGSN or PGW.

Although the above paragraphs provide a simplified description of LTE connection states, more details are discussed below. No attempt is made herein to teach the complete details of the aforementioned GSM/UMTS and LTE wireless network specifications, but enough details are discussed below to provide a framework for discussing aspects and embodiments disclosed herein.

LTE devices have numerous operating states and functions for describing the attachment of UE to the network. Some of those functions are part of the Evolved Packet System ("EPS") Mobility Management ("EMM") functions; some of those functions are part of the EPS Session Management ("ESM") functions.

EMM connection management is performed through the EPS Connection Management ("ECM") function, and an ECM connection consists of a Radio Resource Control ("RRC") connection over a radio interface and signaling connections over network interfaces.

To better understand the operating states of a given UE operating in an LTE environment, each of the states is shown in the table of FIG. 1. At the simplest level, RRC has two states, RRC-IDLE and RRC-CONNECTED. Simply put, RRC-IDLE is the state when no radio interface connection is established yet and RRC-CONNECTED is when the radio has established signaling connections with the wireless network. At power-on, a UE moves from RRC-IDLE to RRC-CONNECTED. Radio resources facilitate communications between the UE and the network. Without radio signaling connections, the ECM connection cannot be established Examining the table of FIG. 3, the network functionality and user experience at the UE is described at each state of operation. Case A is the condition immediately after the UE is powered-on after a long period of being powered-off. The radio interface connection in the UE is idle and no ECM connection can be established until the RRC-CONNECTED state is reached by the radio interface. In this initial state, the user cannot send or receive any data. Normally, if a radio network is available, the phone searches the airwaves and finds this radio network very quickly and moves to Case C.

Continuing on the table of FIG. 3, with Case C, the UE attaches to the network and establishes a default bearer and performs a tracking area update and establishes a dedicated bearer if a UE application requires the dedicated bearer to pass specific data. The device itself manages the mobility of the device. As long as the device remains within the defined tracking area, as currently established with the network, no specific network level communications are required. The tracking area can be as small as a cell or as large as a city, for example, depending on how the network operator defines it. User data can be passed between the network and the device. As noted in the table, this state is the EMM-REGISTERED state.

From the table of FIG. 3, Case D is the condition when the network, the UE, or the application, do not have any data to pass in either direction. After sitting idle for some period of time, usually on the order of an hour, the radio interface connection will drop to idle and without a communications path, the ECM moves to the idle state. As long as the device does not move beyond the tracking area as determined by the UE listening to the eNodeB data channel, the UE can remain in this state. While in this state, the UE remains attached but the application cannot pass data traffic in either direction.

To move from Case D back to Case C, one of three events must happen. As mentioned previously, the device can travel out of the tracking area. The device itself recognizes the change in the tracking area and moves the UE to Case C to begin a Tracking Area Update ("TAU") procedure. The TAU procedure updates the Mobility Management Entity ("MME"), which is responsible for managing the network side of the device mobility. Also, as previously mentioned, an application on the UE may ask for a data connection and once this application initiates the data request, the UE will transition to Case C. The third event that can force the device back to Case C from Case D occurs when the MME generates network signaling to the UE. The network signaling could be because of an incoming voice call, an incoming SMS, or an incoming data packet.

Although transitioning between Case C and Case D is important in the management of the device mobility, transitioning back to Case A or Case B is generally less relevant to aspects disclosed herein.

Turning to FIG. 2, once the power-on condition initiates UE processes, the UE "ATTACHES" to the network. The radio signaling connections are established and ECM connections are established. The ECM-CONNECTED state is when Non-Access Stratum ("NAS") signaling connections are established on the radio communications link. The UE has been assigned physical resources, radio resources and network resources. Upon transitioning to the RRC-CONNECTED/ECM-CONNECTED state, the UE will be considered EMM-REGISTERED when the default bearer is established, an IP address is assigned to the UE, and the network knows the current location (as defined by the tracking area) of the UE.

As long as the UE continues to transmit or receive data messages, then the device will remain in the ECM-CONNECTED/RRC-CONNECTED state. After some period of UE inactivity, the UE moves to an ECM-IDLE/RRC-IDLE state. This state, although seemingly similar to the state prior to power-on at Case A or Case B, is different in that the device actively monitors the network and reselects new cells as required to maintain reception of a cell data channel. Basically, the UE is "ATTACHED" (or EMM-REGISTERED) and waiting for either new data traffic, whether it is mobile originated ("MO") or MT data traffic. The UE is also monitoring the tracking area, which is a cell or group of cells, as assigned and defined by the network during the ECM-CONNECTED/RRC-CONNECTED state, for a change to another cell outside the tracking area. It is important that the UE detect the change and notify the network of its new location so that the device might be "signaled" for an incoming call, incoming SMS or network originated data session. If the UE detects new on-board application data traffic or it changes itself to a cell outside of the network defined tracking area, the UE will move to the ECM-CONNECTED/RRC-CONNECTED state (Case C). Once in the ECM-CONNECTED/RRC-CONNECTED state, the UE will update the network with its new location and the UE will synchronize with the network on a new tracking area. A UE device in a static location could potentially remain in the ECM-IDLE/RRC-IDLE state and EMM-REGISTERED for an indefinite period of time.

Any time a UE, in the aforementioned EMM-REGISTERED mode, begins a power-off procedure or it encounters a radio link failure, the UE returns to the EMM-DEREGISTERED (or UNATTACHED) mode.

The most important part of the description above relates to the EMM-REGISTERED mode and the transition from ECM-CONNECTED to ECM-IDLE states. Repeating the description above, the UE moves from ECM-CONNECTED state to ECM-IDLE state based on UE data inactivity. The UE moves from the ECM-IDLE state to the ECM-CONNECTED state based on new data activity.

Similar to the UMTS/GPRS Network Initiated PDP context, LTE supports a network initiated "connection" transitioning UE from the ECM-IDLE/RRC-IDLE state to the ECM-CONNECTED/RRC-CONNECTED state. This transition can only occur if the UE is already EMM-REGISTERED. In order to initiate the transition of states in the UE, the PGW initiates network traffic to the UE, via another node, the Serving Gateway ("SGW"), which is a data node similar in function to a SGSN in a GSM network, where the SGW node kicks off the connection process if the UE is not already in the ECM-CONNECTED/RRC-CONNECTED state. Once the SGW receives the specific data packet destined to the UE, if a link is not established to the UE via the Evolved NODE B ("eNodeB") (this is the LTE cell site radio equipment), the SGW communicates with the Mobility Management Entity ("MME") to generate the appropriate Downlink Data Notification message to the eNodeB to establish the RRC connection with the UE. Once in the RRC-CONNECTED state, the UE can transition from the ECM-IDLE state to the ECM-CONNECTED state (i.e., the UE has established a connected state for purposes of communicating data), the data packet can be delivered to the UE.

The LTE UE normally establishes the RRC connection when the end-user starts an application to browse the Internet or sends an email. Similarly, the LTE UE establishes an RRC connection if the UE moves into a new Tracking Area and has to complete the Tracking Area Update. The network triggers an RRC connection by sending a paging message. This is typically used to allow the delivery of an incoming data, SMS or notification of an incoming voice call. The paging message is transferred on a Common Control Channel ("CCCH"), which is broadcast over all eNodeB sites within the Tracking Area if the RRC connection is not established.

In the LTE environment, a dedicated bearer is requested (and assigned) to a UE whenever the UE needs a dedicated tunnel for one or more specific traffic types or applications. For example, VoIP, or video services which need a guaranteed bit rate and quality of service to provide a better user experience than the default bearer can support, will be assigned a dedicated bearer. Dedicated bearers can provide special treatment for specific services by providing a guaranteed bit rate where the default bearer cannot provide that dedicated bit rate. Dedicated bearers can provide separation between IP Multimedia Subsystem ("IMS") network traffic, the wireless network function that provides voice and SMS services, and routine Internet traffic. The dedicated bearer is normally linked to a default bearer and can have the same IP address as the linked default bearer.

Based on previous details of the existing GSM/UMTS or LTE systems, one skilled in the art can clearly understand that devices are currently designed to operate, in a general sense, in a DATA-CONNECTED and a DATA-DISCONNECTED state. Without data traversal between the UE and the network during a predetermined period, the UE moves to a DATA-DISCONNECTED state after the period elapses. While operating in the DATA-DISCONNECTED state, the UE device consumes significantly lower power, advantageously uses less network resources, and consumes less data than when it is operating in the DATA-CONNECTED state. Having the network force the UE into a DATA-DISCONNECTED state immediately after communications are completed, or having the UE move itself to the DATA-DISCONNECTED state after communications are completed, aspects disclosed herein of initiating a DATA-CONNECTED state from the network side (i.e., from a public communications network that is coupled to a private network operated by a IOT operator, provides a significant advantage to IOT operators. With lower power consumption that aspects disclosed herein can provide, new battery powered devices and applications can emerge. Additionally, extending and coordinating Discontinuous Receive ("DRX") parameter values between the UE and the device can extend standby time of low power battery devices. Further, the details show that methods currently exist for the network to initiate a connection to transfer the UE to the DATA-CONNECTED state. U.S. patent application Ser. No. 15/093,560 demonstrates practical methods to induce the wireless network to initiate a connection to the UE to allow downlink data to be initially passed and subsequently allow bi-directional data transfers between a server and a wireless communications device.

Power management in wireless communications devices has been one of the most studied sciences among the development aspects of wireless chipsets and handset design. Not only is the chipset design critical, application of that chipset, and software controlling that chipset is critical. Even user interface preference setting can have a major effect on handset battery life. Something as simple as screen brightness or backlight timing can have significant effects on the power required to operate handsets and smartphones. Many different system architectures have been created to maximize the capabilities of the battery powered communications device while extending the battery life to an acceptable length of time for typical users. Over time, system level enhancements have enabled the small smartphone to increase both computing capability and graphical user experience all the while increasing the battery life.

Figure 12A:
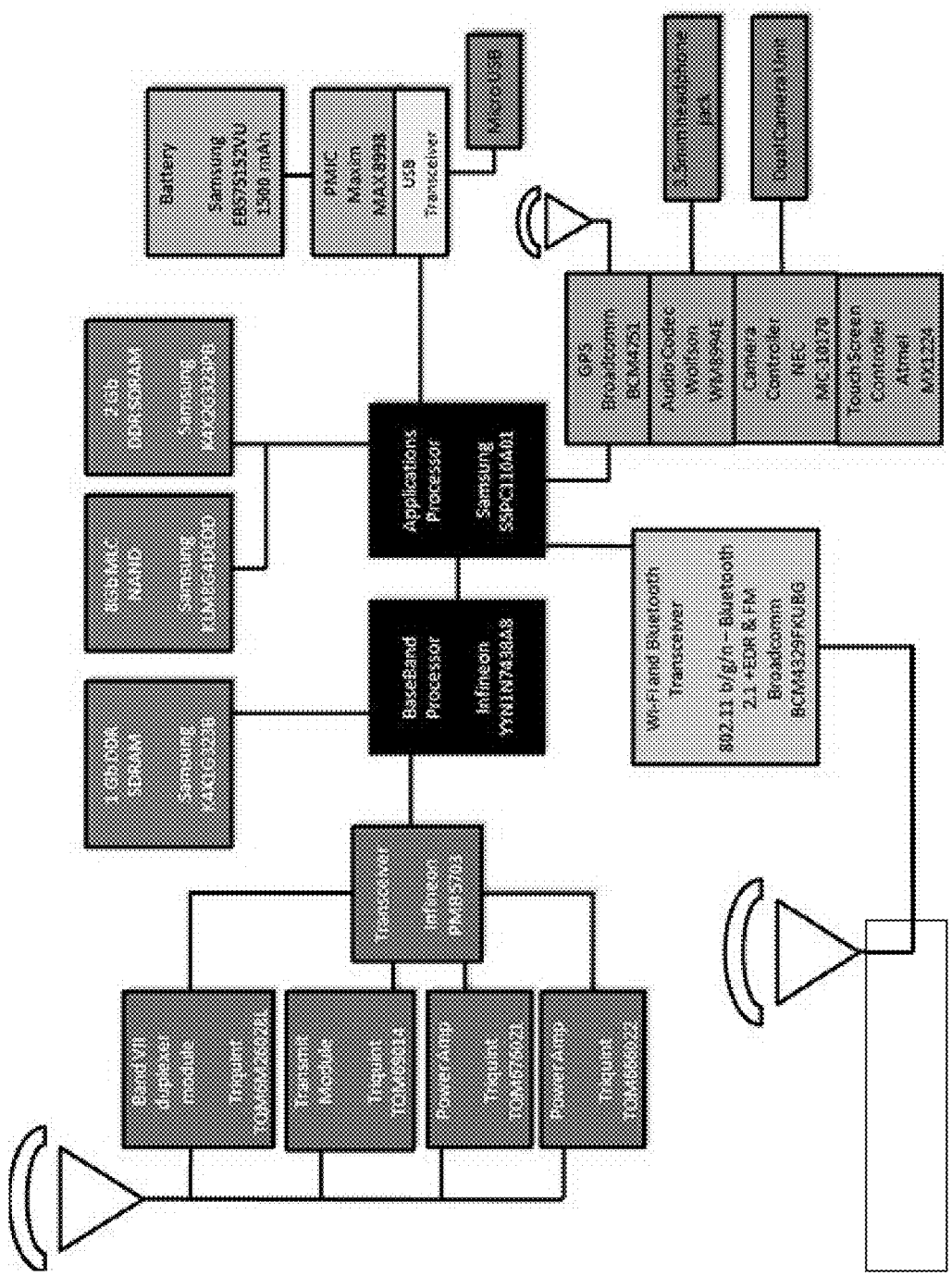
FIGS. 12A, 12B, and 12C illustrate smart phones having a baseband processor for managing network communications and a separate application processor for delivering the user experience and to manage alternative radio access technologies and GPS.
Figure 12B:
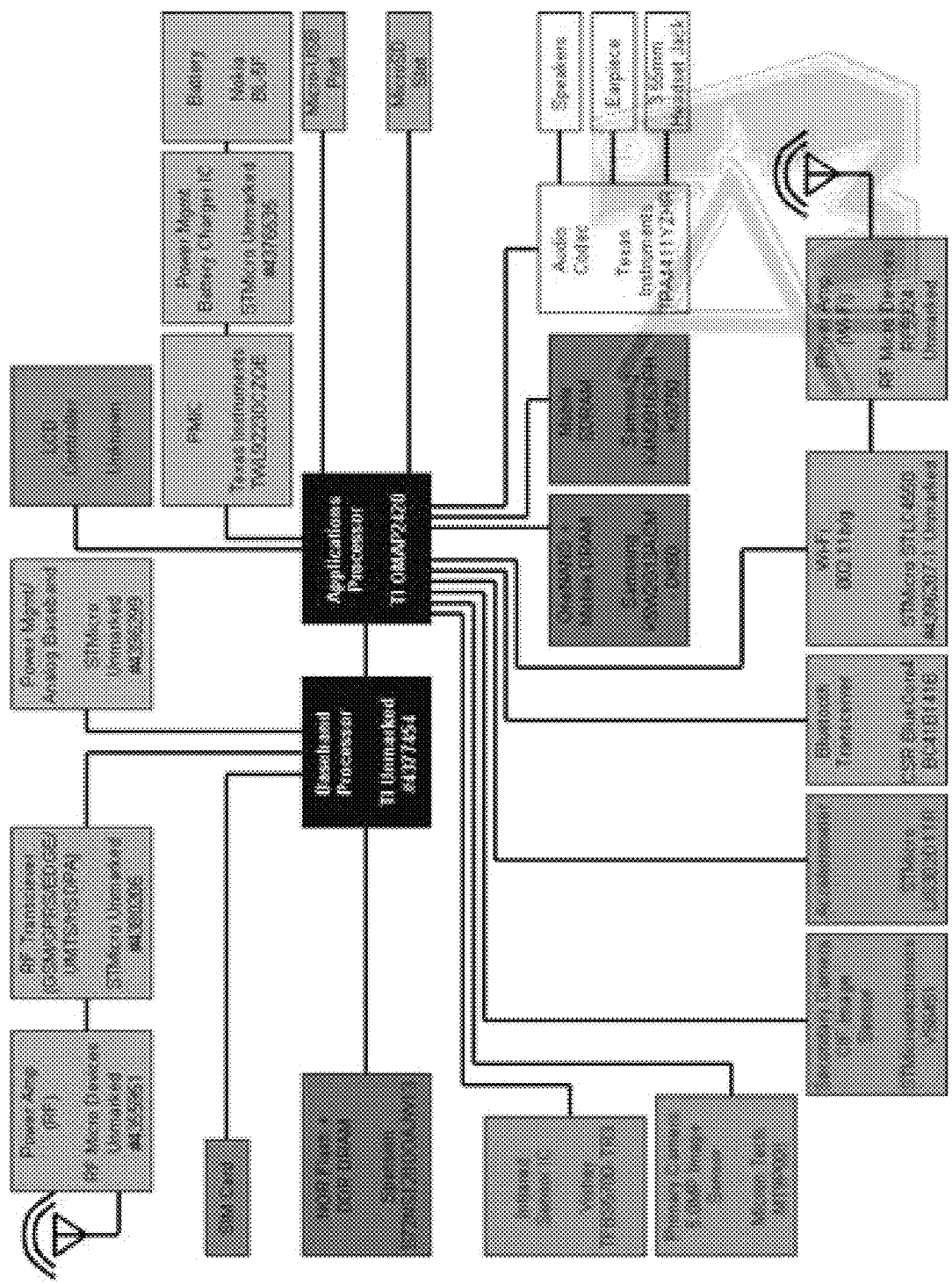
Figure 12C:
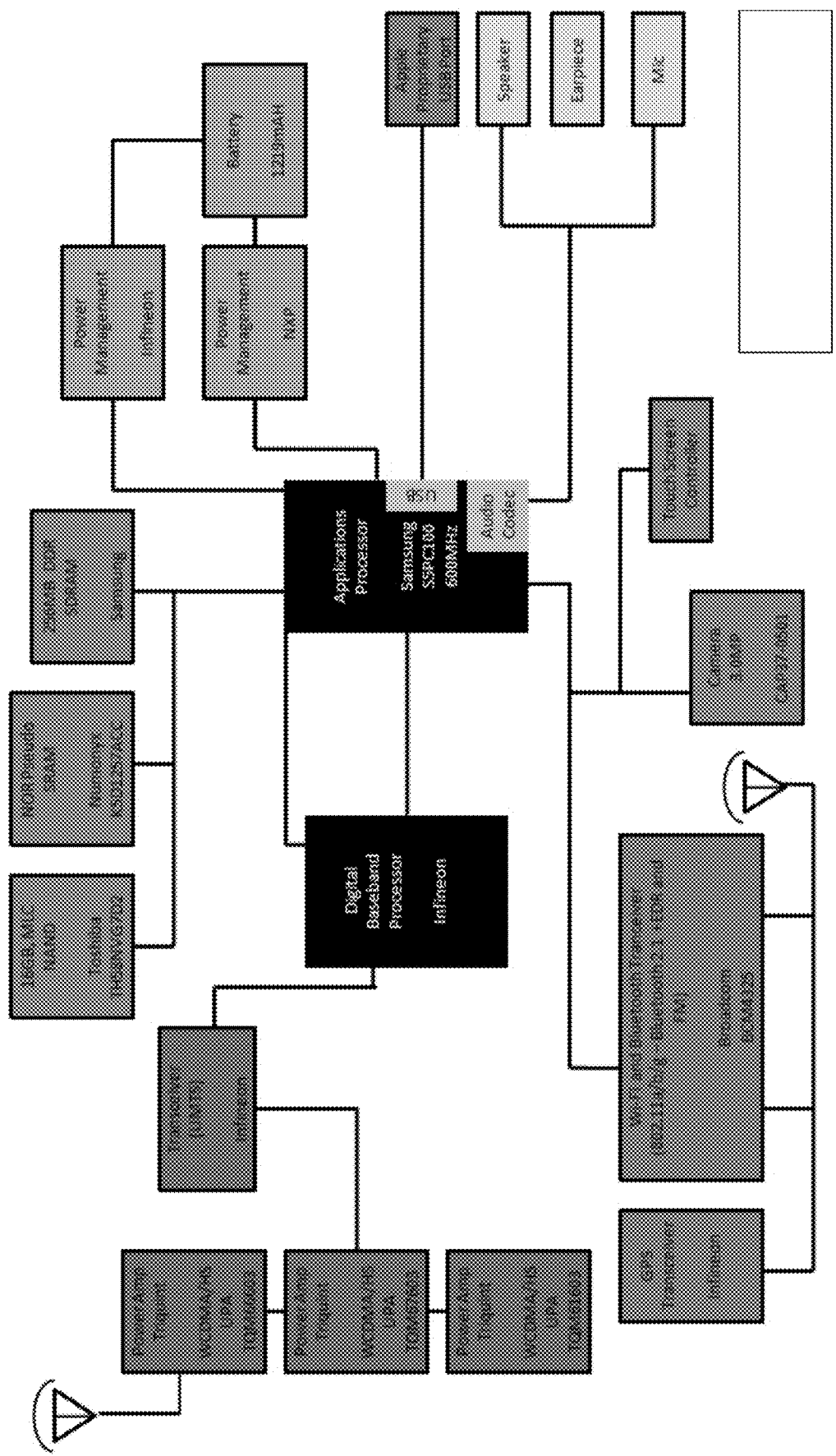

FIGS. 12A, 12B, and 12C show block diagrams of examples of WWAN communications devices (cell phone) that have a dedicated baseband processor as well as a secondary applications processor managing the user interface, graphical display, touch input, camera and secondary radios like WiFi and Bluetooth. The baseband processor manages all RF control functions, analog to digital conversion, and network access services. The baseband processor manages OSI model Layer 1, Layer 2 and Layer 3, which comprises the Physical Layer, Data Link Layer and Network Layer. The Network Layer provides variable length byte sequences called datagrams to Layer 4 in the Applications Processor. These example block diagrams use two physically different integrated circuit processors.

Figure 13:
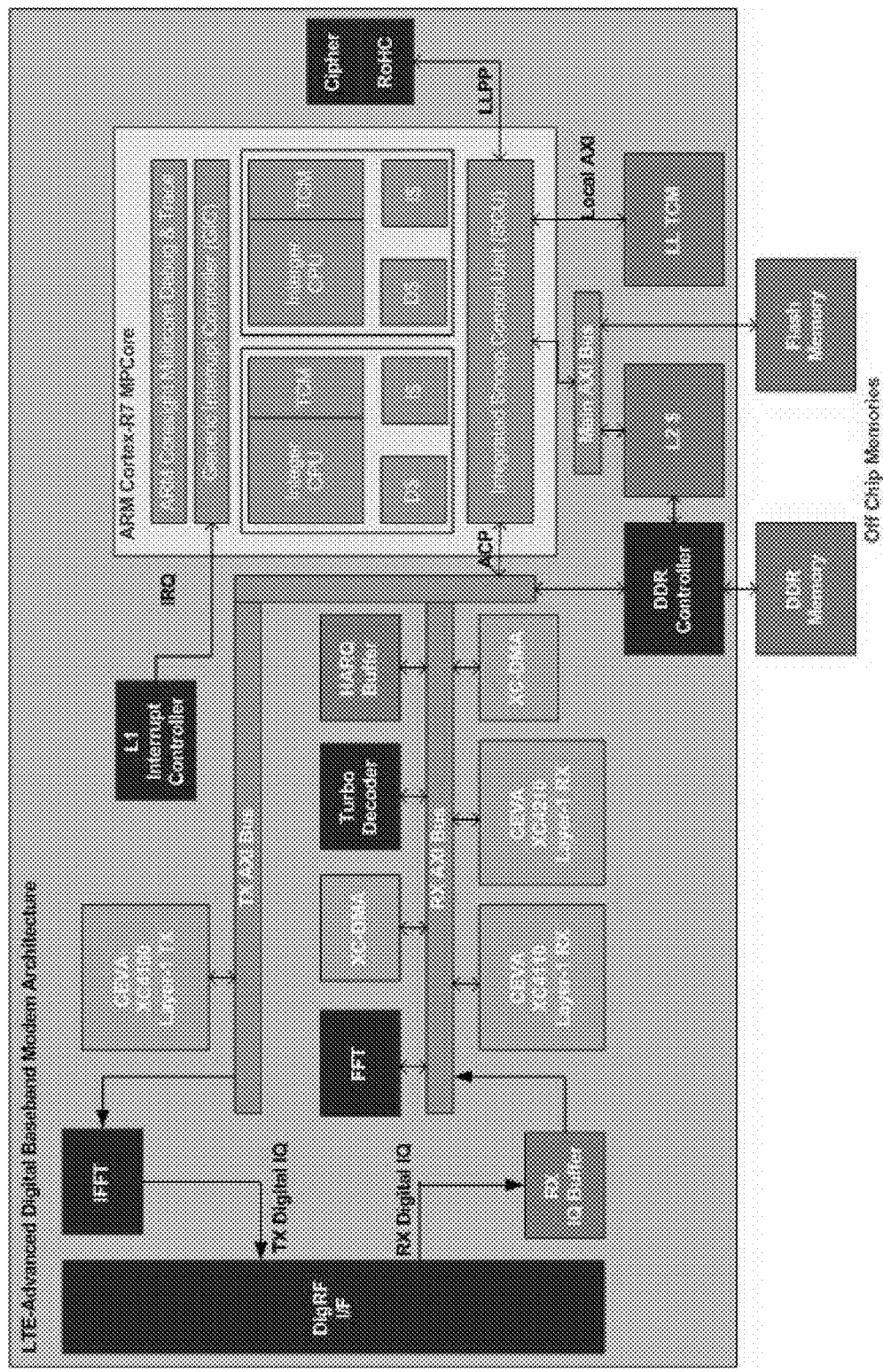
FIG. 13 illustrates a typical baseband processor for managing mobile network communications.
Figure 15A:
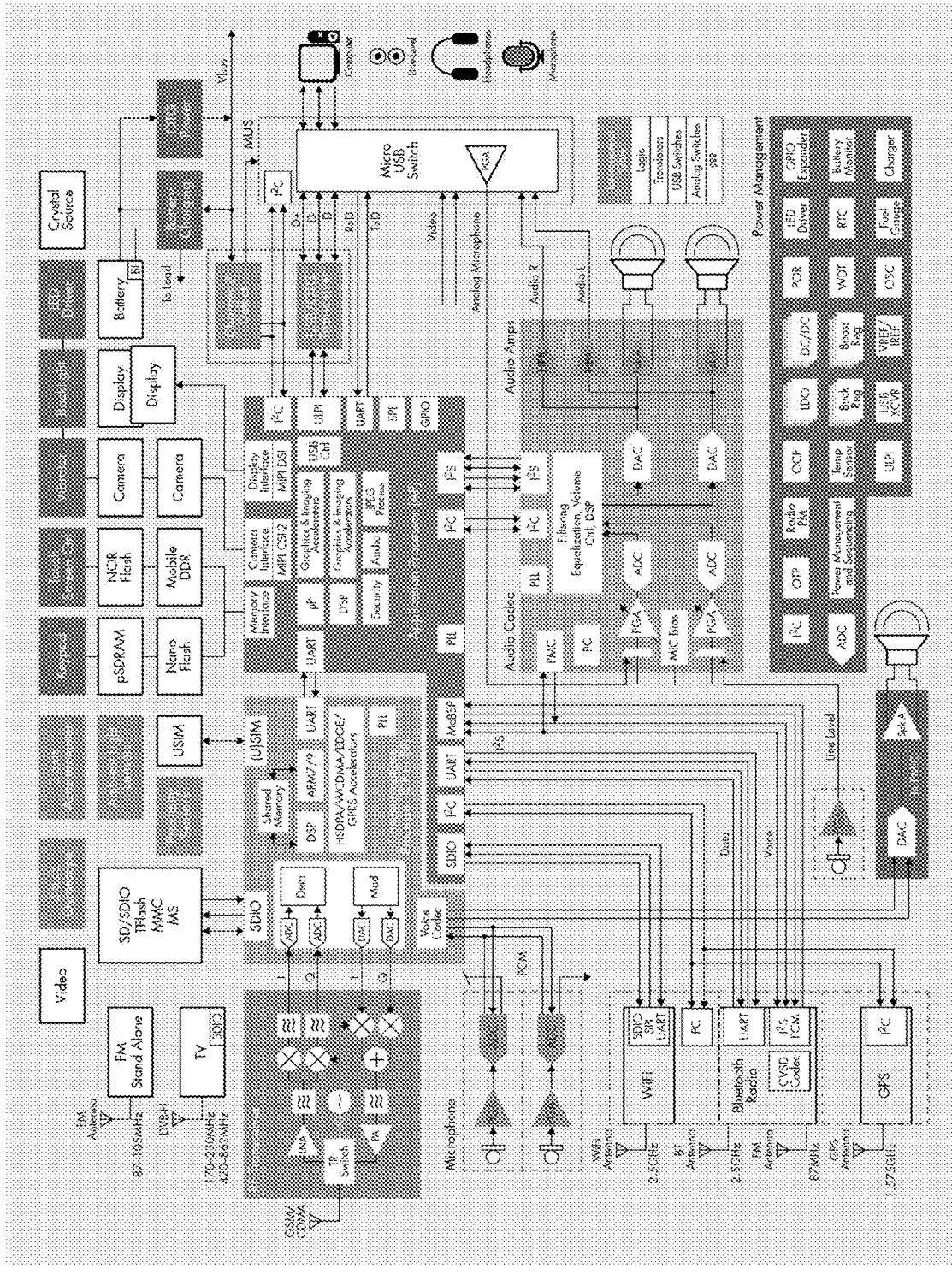
FIGS. 15A and 15B illustrate modern smartphone architecture using a SOC shown in FIG. 14.
Figure 15B:
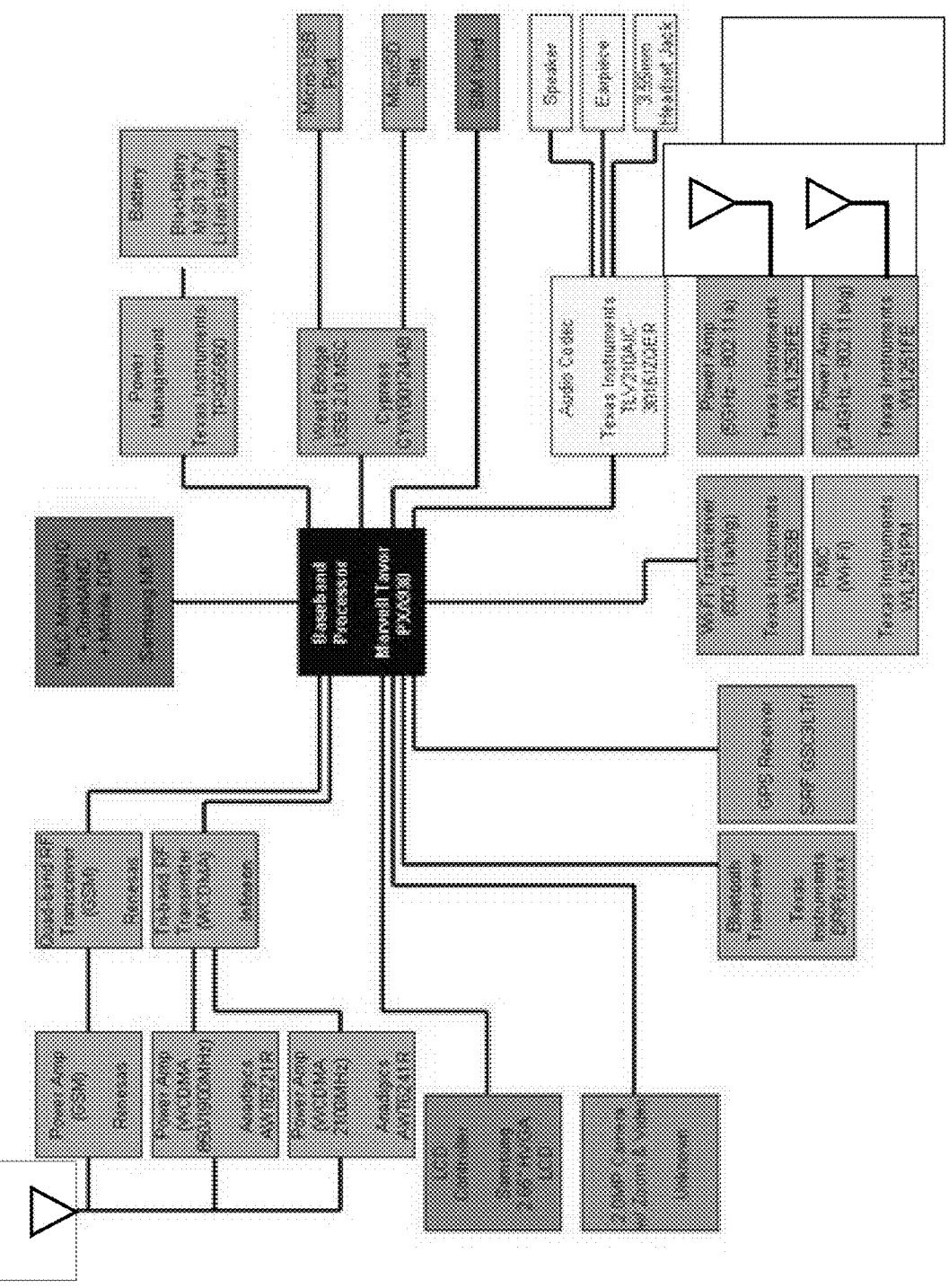

FIG. 13 is a block diagram of an example baseband processor that might be used in a design as shown in FIG. 15B.

Figure 14:
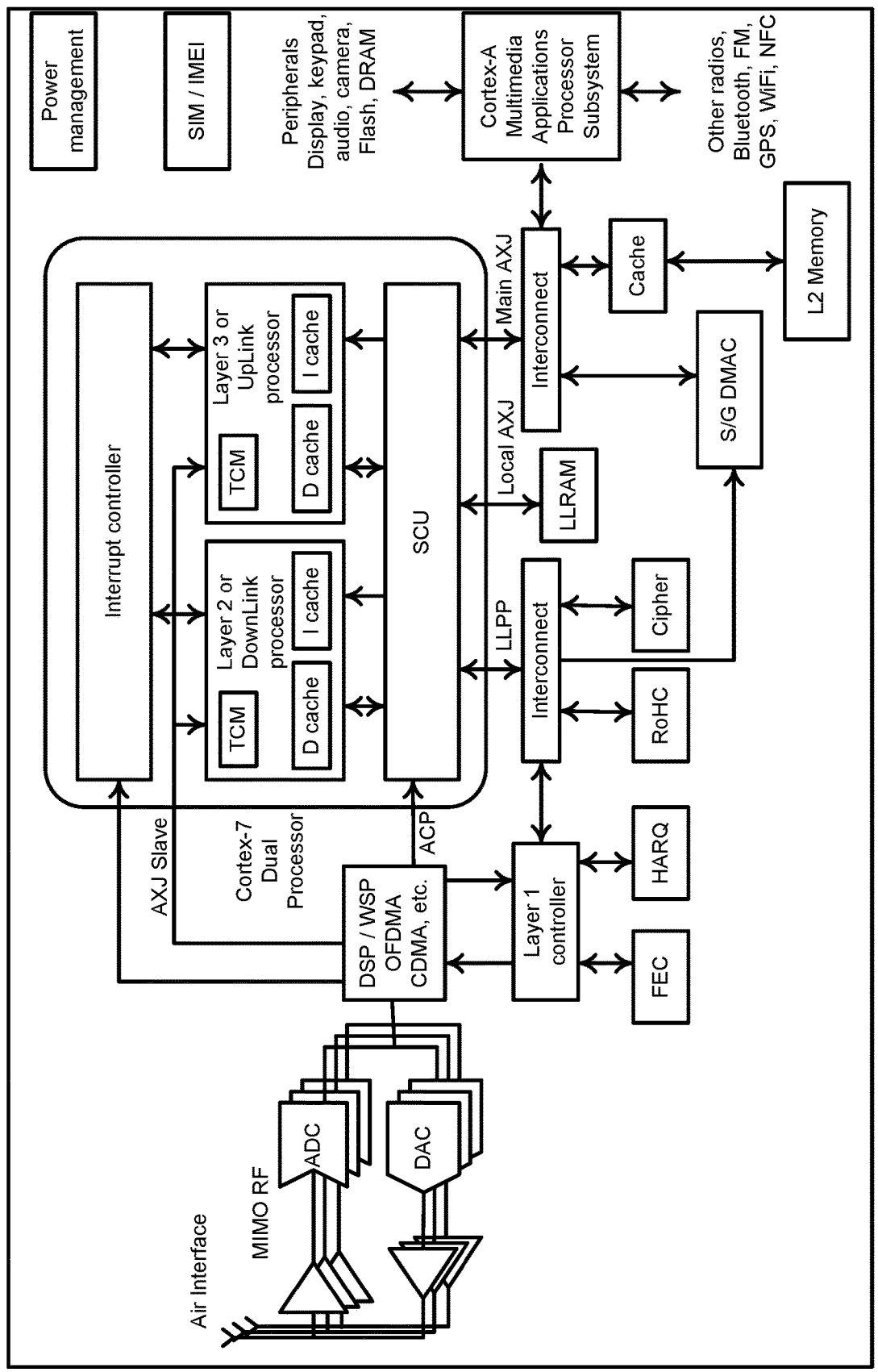
FIG. 14 illustrates a 'system-on-a-chip' solution for managing both the mobile network communications and the applications processing for delivering the user experience and to manage alternative radio access technologies and GPS.

FIG. 14 is a block diagram of an example WWAN system-on-chip [SOC] design that combines the dedicated baseband processor of FIG. 13 with the application processor into a single system-on-chip. The functions show on this diagram show a discrete Layer 1, Layer 2 and Layer 3 controllers, each interconnected to provide baseband network functions. The I/O for the baseband functions are interconnected to a co-located Cortex A processor to provide support multimedia and applications processing as well as the management of secondary Bluetooth, Wi-Fi, GPS, NFC and FM radios. Such a design allows the baseband processor to manage the processing intensive interface to the mobile communications network while leaving nearly all the bandwidth of applications processor for delivering user functionality, services and computationally intensive applications.

FIG. 15A is a block diagram for an example modern smart phone showing the previously mentioned (or similar) SOC processor. To be noted is that the baseband processing is separated from the applications and user interface processing.

Figure 16:
FIG. 16 illustrates a high-level block diagram for a SOC with a dual-core application processing subsystem as well as the baseband processor for managing mobile network communications.

FIG. 16 shows a block diagram of an example SOC design that has two Cortex A-9 application processors in addition to the baseband processor.

Figure 17:
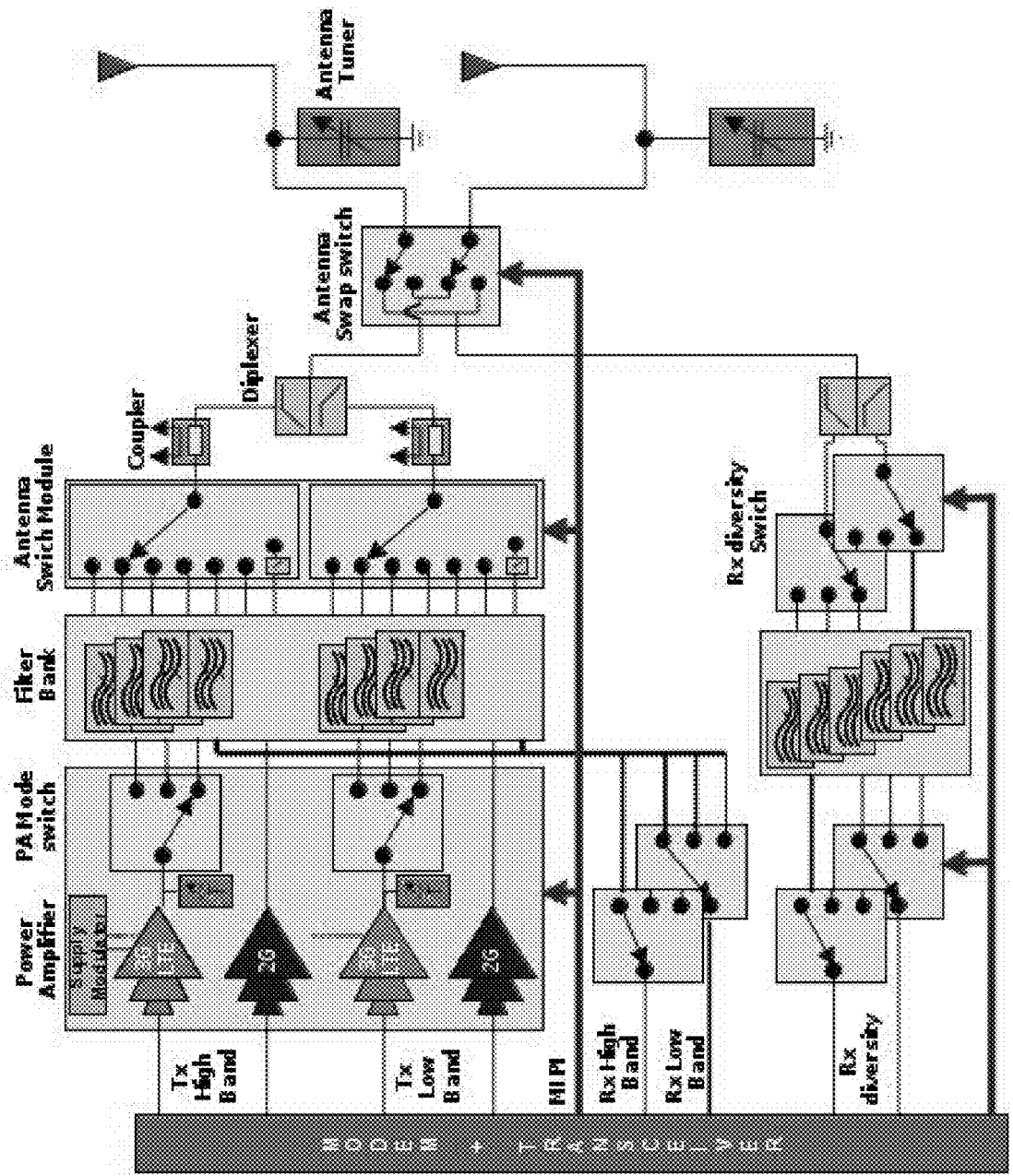
FIG. 17 illustrates the typical external RF components required for either the complex SOC with baseband as well as applications processing or the simpler baseband processor.

FIG. 17 shows a block diagram of the external functions and components that are combined with a single chip SOC for realization of a communications device.

Figure 18:
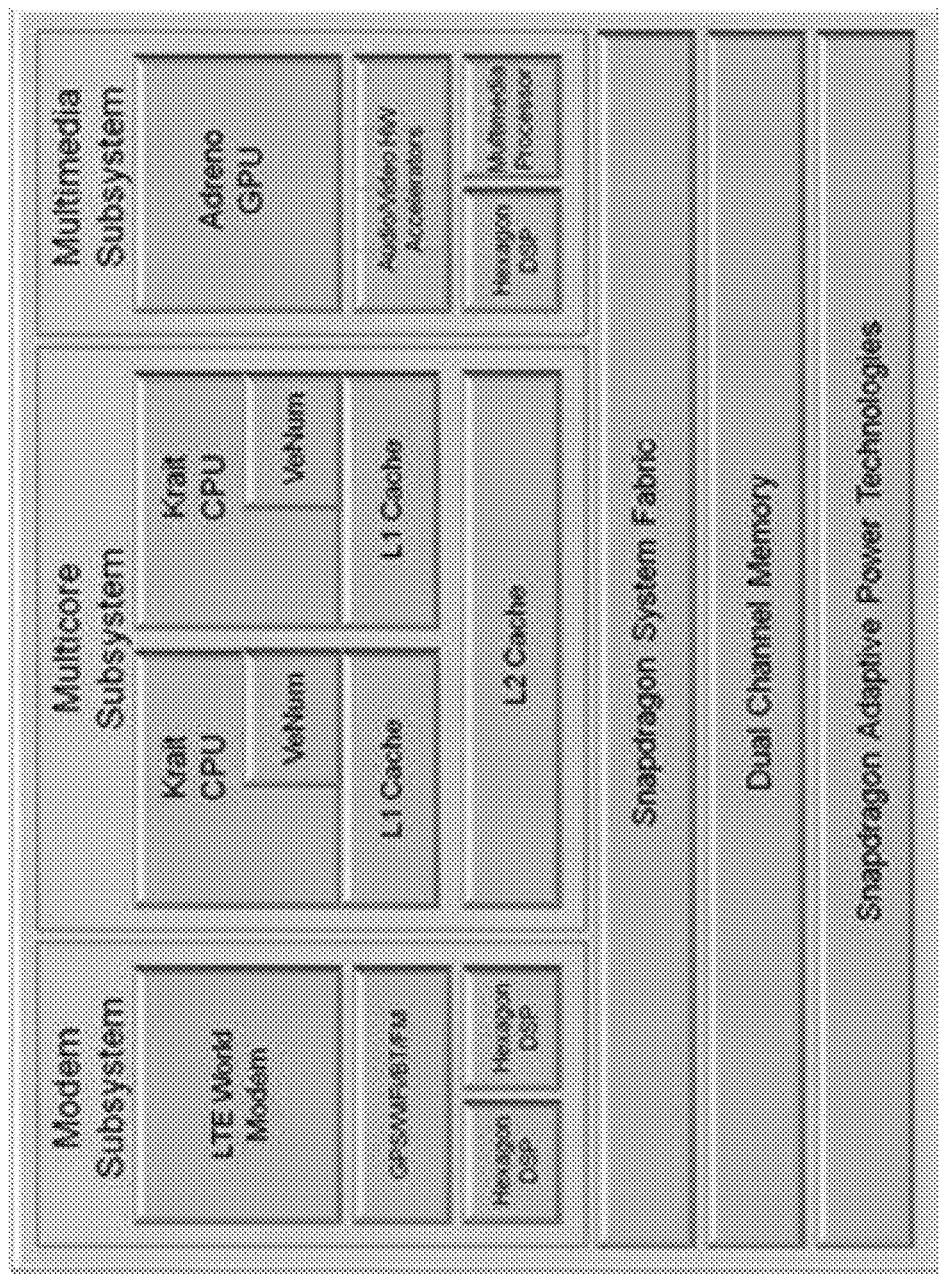
FIG. 18 illustrates a modern, sophisticated Qualcomm Snapdragon multicore mobile handset processor utilizing a SOC that contains the baseband processing, multiple application core processors and graphical/user-interface processor.
Figure 19:
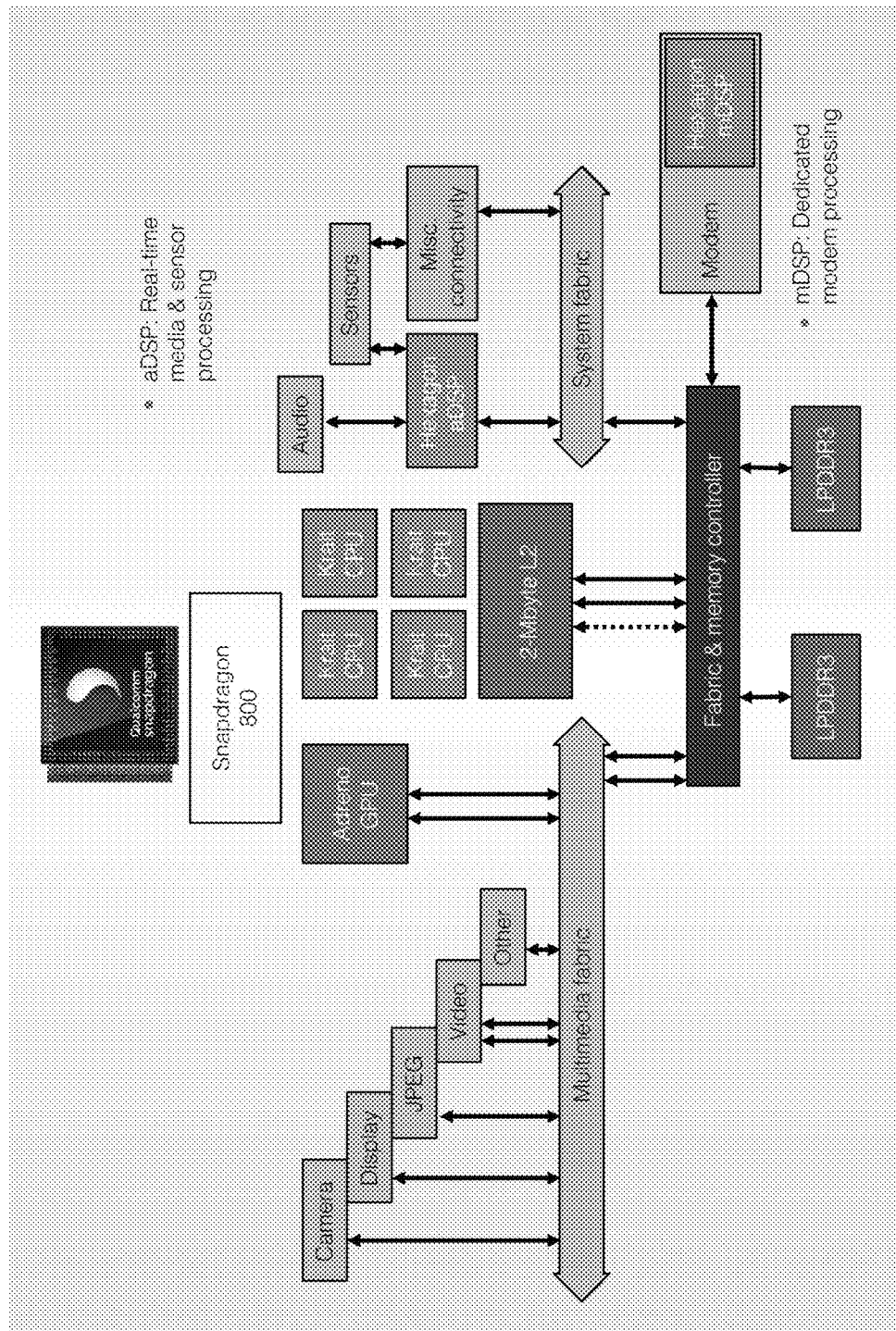
FIG. 19 illustrates a modem similar to FIG. 18 but includes more application cores and more processing for the graphical/user-interface.

FIG. 18 and FIG. 19 show block diagrams of modern SOC designs supporting baseband processing, multiple core application processing and additionally a core supporting graphics processing.

In the cases above, most significantly to be noted is that a separate dedicated modem-processing core exists to handle the baseband processing of the mobile communications device. In almost every case, the baseband processing is handled thru Layer 2 or Layer 3 of the OSI model. As the sophistication of the mobile applications increases, modern SOC designs have added processing cores to facilitate the management and delivery of those applications. During time of peak usage, when higher processing requirements demand more computing power, more cores are enabled to deliver that computing power. Managing the power supply current becomes a major factor for multi-core processors. As such, newer SOCs have been designed to support power management of the cores, stopping the clocks and removing the power from the unused cores.

Figure 20:
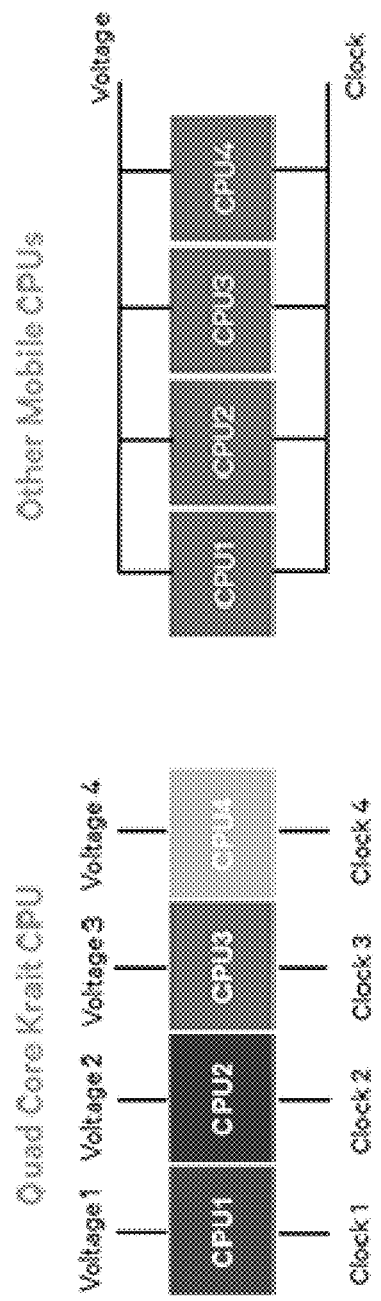
FIG. 20 illustrates the Snapdragon power and clock distribution on the left as compared to typical SOC mobile processors on the right.

FIG. 20 shows a block diagram of a modern Qualcomm Snapdragon mobile processor power and clock distribution subsystem where power and the clock for each application-processing core can be independently controlled based upon the need in the application processing subsystem.

Figure 21:
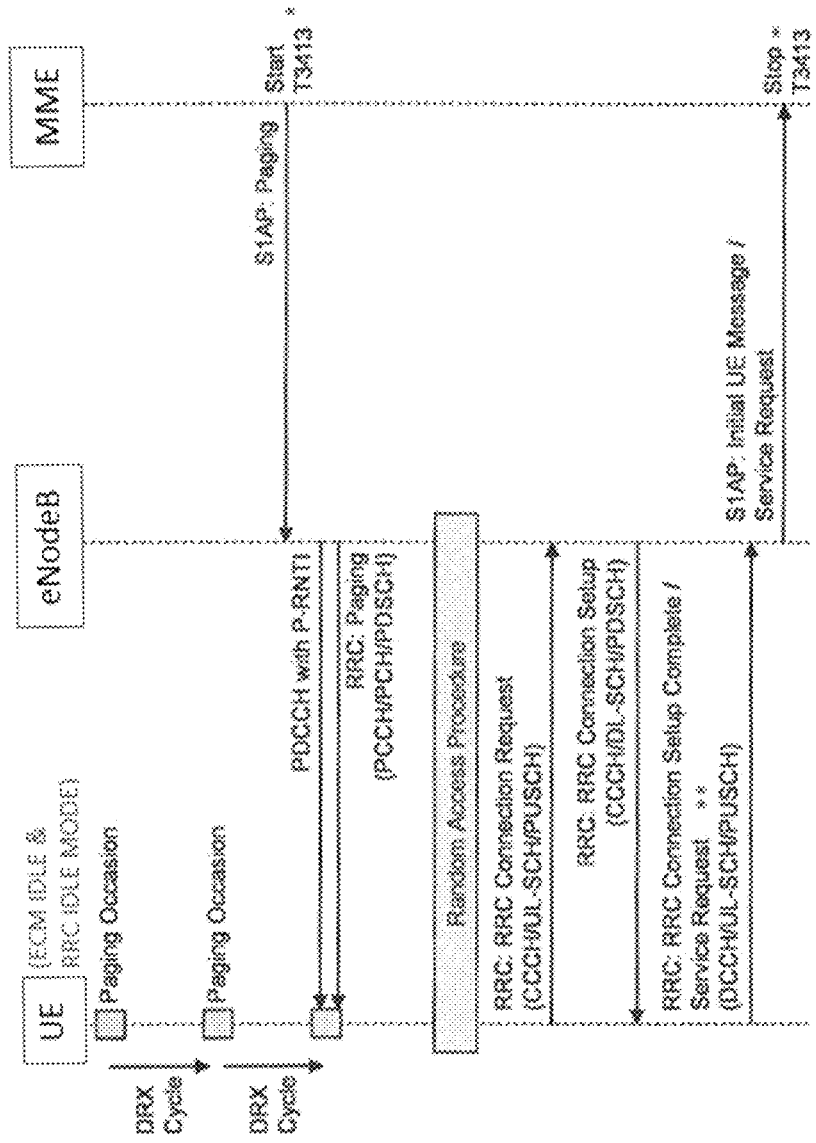
FIG. 21 illustrates the Discontinuous Receive function as defined by 3GPP for LTE.

In an effort to achieve maximum battery life while maintaining a reasonable customer experience, the aforementioned Discontinuous Receive Function ("DRX") was specified in the 3GPP specification. The DRX function allows the baseband processor to suspend processing for short periods of time by coordinating the signaling messages from the network with the sleep period of the baseband processor. This power savings is done at the expense of the device response time; specifically, the device response time for incoming calls, or SMS messages. FIG. 21 shows a ladder diagram of the DRX feature in a typical UE-network implementation. Since user data sessions are typically UE-initiated and controlled by the applications processor, most applications, email, and application notifications will occur in real time or near real time.

Each of the above diagrams highlight the discrete baseband processing subsystem and application processing subsystem used in modern SOCs for mobile communication devices. Since many of these devices are sophisticated processing devices with complex operating systems, almost all communications between the network and the mobile devices are based on Internet Protocol [IP]. Typically, the IP stack above layer 3 is implemented in at least one of the application processors. To facilitate IP communications, at least one of the application processing cores must be powered and clocked to process the incoming datagrams from layer 3 in the baseband processor subsystem. Operating the application-processing core will require power.

Figure 22:
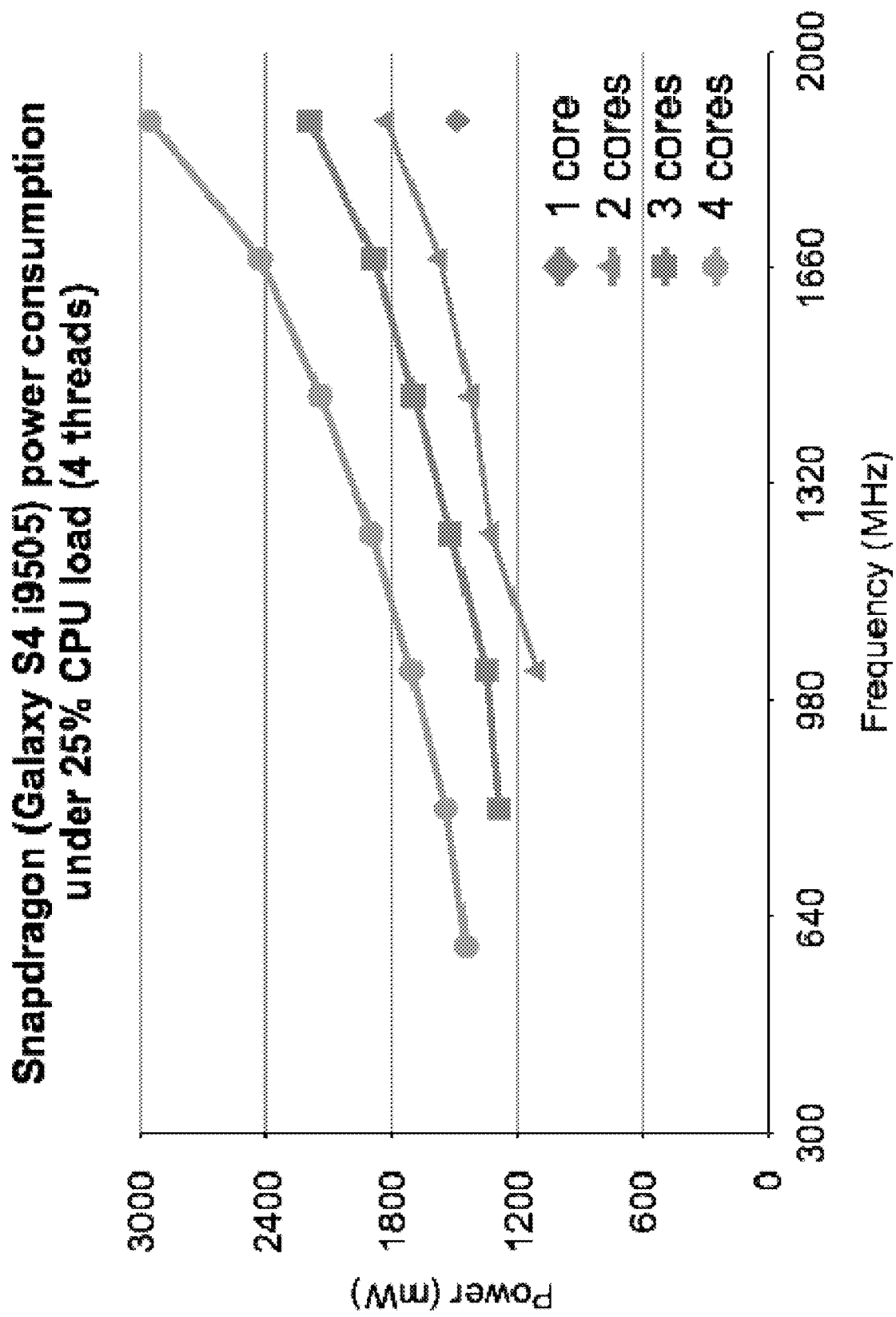
FIG. 22 illustrates the relative amount of power required for operating each core.

Turning to FIG. 22 one can see that each uses at least 300 mW of power at the peak operating frequency. Operating at a slower operating frequency, each core requires at least 100 mW of power. If it is possible to suspend the single application-processing core handling the communications above layer 3 of the OSI model, then some power can be saved in application where lower power usage is critical to the application.

For IoT applications that require an on-demand connection to a wireless device, reducing the power requirements of the device could be critical, especially if the device is truly a mobile device and powered by batteries for a significant part of its life.

LTE devices establish and maintain a dedicated bearer-IP connection between the PGW and mobile device. Since part of that mobile device requires an application processor to manage and route the IP messages within the device itself the application processor is powered and clocked. In many modern SOCs, the baseband processor has excess processing capability but not enough excess processing capability to manage the entire IP stack. When a device is powered on and the device is EMM-REGISTERED with an Attach procedure, the MME has knowledge of the UE location, to at least the accuracy of the tracking area list allocated to that UE. Further, the UE will have at least one active PDN connection, as well as an EPS security context.

When GSM/UMTS devices attach to the network, the HLR has knowledge of the UE location, but unless specifically requested, no PDP context, and hence IP address exist, unless a permanent IP address is assigned to the device.

Since the methods of operating a wireless device using network-initiated signaling are understood and previously disclosed, this disclosure highlights ways minimize power consumption of LTE and GSM/UMTS devices. Internal to the chip and the mobile device, the best way to minimize power consumption is to minimize clock speed of active subsystems and power off other subsystems. Maintaining an active applications processor demands unnecessary power. Shifting certain functions to the baseband processor could eliminate the need to power an applications processor, but the IP functionality might be lacking.

Shutting down the applications processor until any incoming datagram is received and presented from the baseband processor to the applications processor may have merits, but a disadvantage is that incoming data is not screened before shifting the application processor of the mobile device to a high-power mode to fully receive and analyze the incoming data as well as potentially respond to the incoming message.

A better solution, as disclosed herein, is to enable the baseband processor to analyze the incoming datagram before performing anything that increases the power consumed by the UE device beyond the minimal required for baseband processing. The solution could include conditions established prior to the application processor entering the low power mode. The solution could include permanent conditions or temporarily established conditions to screen incoming datagrams before the baseband processor wakes the application processor.

In an aspect, a server and a UE device may share a shared value before the UE enters a low power state. Or, the server and UE device may share the shared value in an awaken message transmitted from the server to the UE after the UE has entered a low power state. The shared value may be used in conjunction with a stored secret value to derive awaken information at the server before the UE device enters a low power state, for which low power state the awaken information will be compared with a transition from low power state criterion by the UE to determine that the UE should exit the low power state when the awaken information matches the transition from low power state criterion. Or, the shared value may be used in conjunction with a stored secret value to derive awaken information at the server after the UE device enters a low power state. The UE device may generate the transition from low power state criterion, based on the shared value and stored secret value, before going into the low power state, upon receiving the shared value in the awaken message after the UE device has entered the low power state, or at any other time after the UE device has entered the low power state.

The Open Systems Interconnection model (OSI model) is a model that characterizes and standardizes the communication functions of a telecommunication or computing system without regard to the underlying internal structure and technology. A layer serves the layer above it and is served by the layer below it. Although wireless devices may not always be implemented by the strictest definition of the OSI model, most are close. As most follow this model, the baseband processor almost always provides the Layer 1, Physical Layer and Layer 2, the Data Link Layer. Layer 3, the Network Layer may or may not be implemented in the baseband processor. In either case, a baseband processor can be operated in such a way that a template comparing the received datagram to an actionable datagram is possible. If implemented at Layer 2, the addressing may be using physical addresses, for example, and large messages may be segmented, but incoming messages can be evaluated and compared to a template message or messages. If Layer 3 is implemented in the baseband processor, then the messages may be mapped to logical addresses and the messages fragments may be assembled properly.

Although functionally possible and open for consideration, high layers could be implemented in the baseband processor and messages from those layers could also be compared to the template or templates for use as a trigger to wake up various additional power consuming subsystems within the mobile device.

An ideal minimalist solution would be to examine the incoming Layer 3 messages to see if the messages originated from an authorized and defined server and were from a specific pre-defined power and were destined to a specific pre-defined port. Upon receipt of the message from the proper address and port, to a specific predefined port, with anything else within the message ignored, the baseband processor could forward some notification or activate some hardware control signal to enable the clocks and power for the applications processor on the mobile device, whether the device was a SOC or the device was one of several physical discrete processors implemented on the mobile device.

Figure 4:
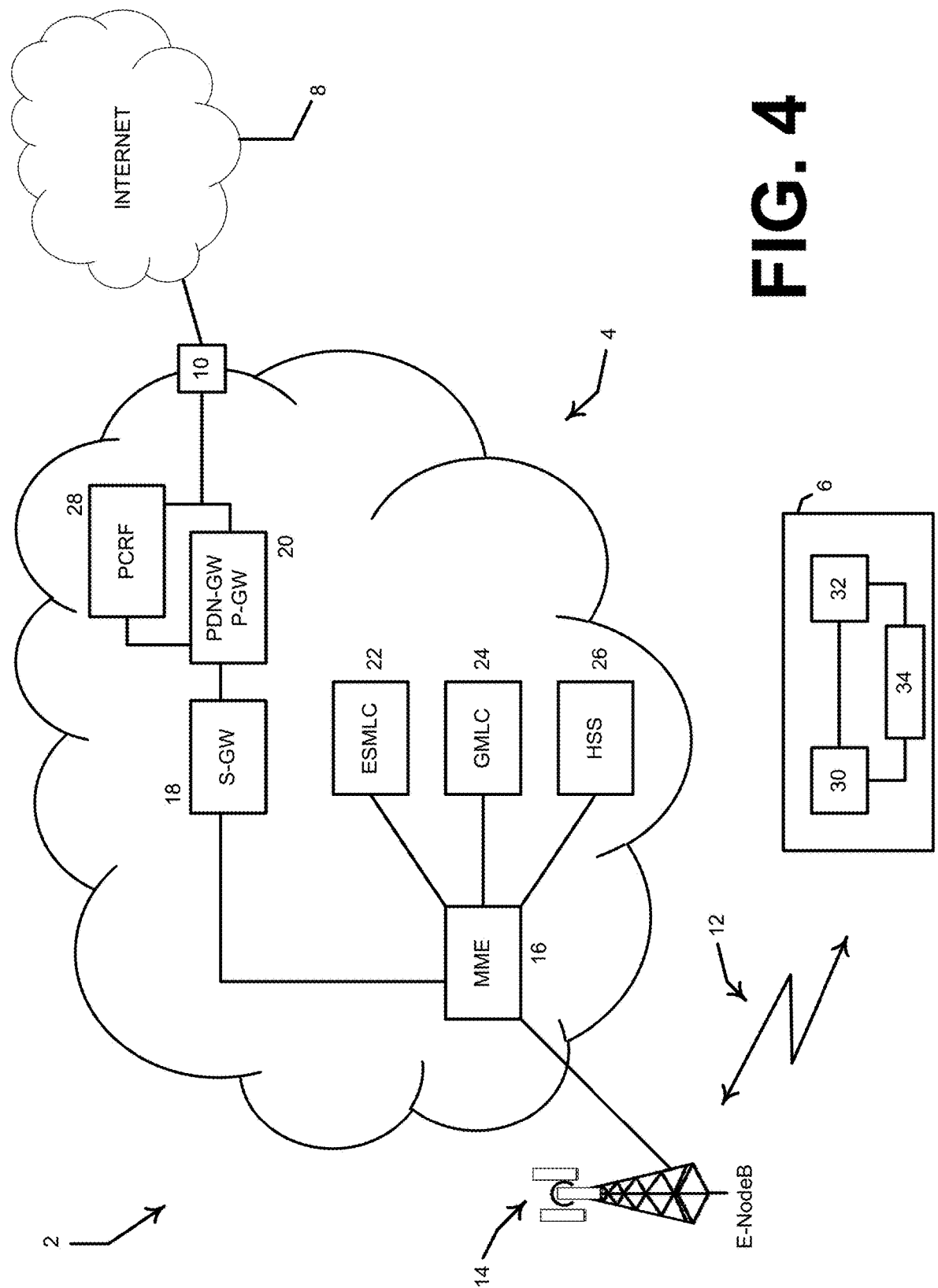
FIG. 4 illustrates a network diagram for wireless communication with a UE device having first and second processor portions.

Turning now to FIG. 4, the figure illustrates a communications network environment 2. Evolved Packet Core network 4 ("EPC") connects a wireless communication device 6 with Internet 8 via Access Point Name defined endpoint 10. Access Point Name 10 typically has a unique identifier, which may include a unique friendly name that corresponds to a unique machine-understandable identifier (i.e., a name that is meaningful to humans and that uniquely corresponds to a unique identifier, such as a MAC address or internet protocol ("IP") address), and which may be referred to as Access Point Name ("APN") herein. Wireless device 6 may be one of a plurality of types of devices, including a consumer user equipment device (e.g., smart phone, tablet, PC, and the like), a machine device such as a vending machine, a refrigerator, a gate, a door, a camera, and the like. Another example of a machine device is a vehicle telematics device that may be coupled to a communication bus of a vehicle for providing connectivity of a vehicle, and computer modules thereof (as well as user equipment devices). Reference herein to a user equipment device ("UE") may be, or may be understood to be, a reference to wireless device 6.

UE 6 typically communicates (i.e., receives messages from and transmits messages to) with EPC network 4 via wireless link 12 via eNodeB 14, which represents a radio access network part of a Long Term Evolution network ("LTE"). ENodeB 14 communicates with Mobility Management Entity ("MME") 16 and Serving Gateway ("SGW") 18. Generally, MME 16 manages signaling between UE 6 and other components of network 4, including SGW 18. SGW generally serves as a mobility anchor for data bearers for device 6 as the wireless device moves being connected to one eNodeB 14 to being connected to a different eNodeB, among other functions. Packet Data Network Gateway, or Packet Gateway ("PGW") 20, generally manages IP addresses for wireless device 6, among other functions. E-SMLC 22 communicates with, and cooperates with MME 16, as do GMLC 24 and HSS 26. Policy Control Rules Function ("PCRF") module 28 cooperates with PGW 20 is determining and regulating packet flows through APN 10.

As discussed above, it may be desirable for device 6 to consume very small amounts of power when it is powered by a battery and is not actively processing packets and data in performing a function for a user. Thus, a first processor portion 30 may stay 'awake' so that device 6 stays registered with network 4, but may be idle with respect to its data connection (e.g., UE device 6 is in RRC-IDLE mode, or state) via link 12 to the EPC. First processor portion 30 may consume enough power to 'listen' for an incoming message over link 12, and upon receiving a message via the wireless link, the first processor portion may determine that second processor portion 32 may need to transition from a low power state (e.g., UE device 6 transitions from RRC-IDLE to RRC-CONNECTED in an LTE network) so that it can perform functionality that first processor portion 30 may not be configured to perform. First processor portion 30 and second processor portion may connect to, be coupled with, or may otherwise have the ability to access a shared memory 34. Memory 34 may contain a template, or criteria, that first processor portion 30 may compare with information, or data, received in a message via link 12 to determine whether second processor portion 32 should exit a low power state, or transition from a low power state. Information contained in the template, or contained in the criteria, that is used for the comparison may be referred to as 'transition from low power state criterion'. If information contained in a message received by first processor portion 30 matches, or satisfies, information in the transition from low power state criterion, or template, the first processor portion 30 may generate an instruction to transition from low power state and provide the instruction to second processor portion 32. Upon receiving the transition from low power state instruction from processor 30, second processor 32 'awakens', or exits a low power state it may have entered to conserve power and begins processing data it may receive from first processor portion 30. First processor portion 30 may be a baseband processor, or modem processor, and second processor portion 32 may be an application processor with greater processing capability than the first processor portion. But, the modem processor 30 may be able to operate with very low power consumption while 'listening' for an incoming message via link 12. Application processor 32 typically has greater processing capabilities than the baseband processor 30, with correspondingly greater power consumption than the baseband/modem processor. Both processors 30 and 32 may share memory 34. In an aspect, memory 34 may only accessible by modem processor 30. And, it will be appreciated that even if processors 30 and 32 share access to memory 34, application processor 32 typically would be unable to access memory 34 while in a low power state. Furthermore, it will be appreciated that wireless device 6 typically includes features not shown for purposes of clarity, including a display, control buttons or pads, antennas, a GPS receiver, various sensors that may be device-use-specific, such as temperature sensors, accelerometers, gyroscopes, barometers, moisture sensors, and the like. Any of the sensors could be used to generate a signal that either awakens second processor 32 directly, or that provides a trigger signal to first processor 30 that triggers the generating and providing of a transition from low power state instruction to cause the second processor 32 to exit a low power state.

In an aspect, first processor portion 30 may stay 'awake' so that device 6 stays registered with network 4 and first processor portion may also maintain a data connection, for example RRC-CONNECTED in an LTE network environment, via link 12 even though second processor portion 32 may be in a low power state. Such a scenario would still be considered and referred to herein as a low power mode, or low power state, of UE device 6. Thus, because second processor portion 32 may be idle, inactive, off, or otherwise in a low power state, the second processor would not consume significant power even though first processor portion 30 maintains a data connection with network 4, thus reducing overall power consumed by UE device 6 even though a data connection is maintained or active between the UE and packet core network 4.

Figure 5:
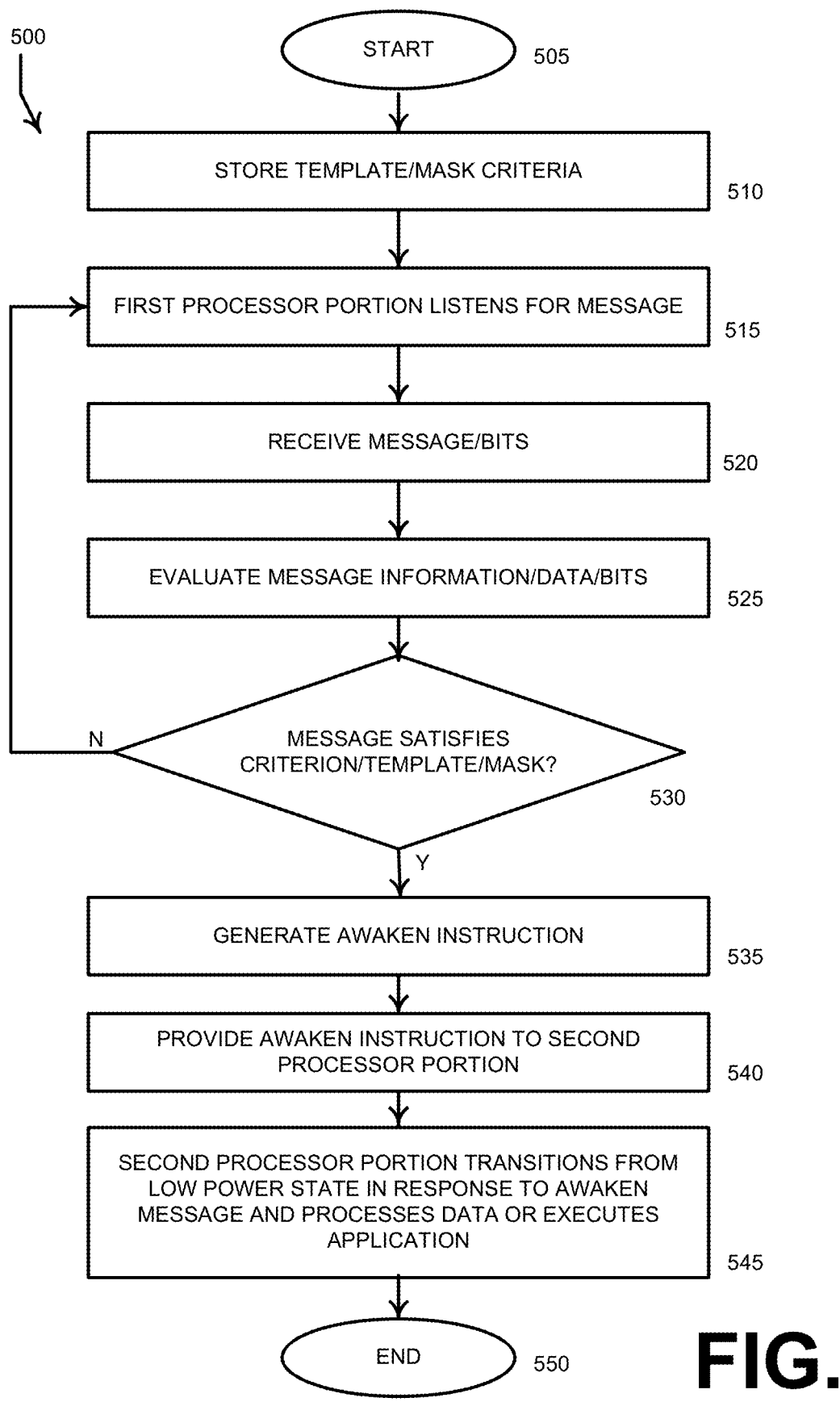
FIG. 5 illustrates a flow diagram of a method for a first processor causing a second processor to transition from a low power state during which the first processor can listen for, receive, and process messages.

Turning now to FIG. 5, the figure illustrates a flow diagram of a method 500 for a modem processor of a wireless communication device to awaken a more sophisticated application processor of the wireless communication device from a low power state. Method 500 starts at step 505. At step 510, a transition from low power state template is stored to a memory that the modem processor, which may be referred to as a baseband processor or as a first processor (or first processor portion) can access. The application processor, which may be referred to as an application processor or as a second processor (or second processor portion), may also have the ability to access the memory that the template is stored in. The template may include data or information that may be used to test whether message data contained in the message received by the wireless communication device's front end radio circuitry and processed by the first processor portion is intended by a sender, or sending device, of the received message to cause the more sophisticated, and typically higher-power-using second processor, to transition from a low power state so that the second processor portions higher sophistication can process data and information, which may be received from the first processor portion, which may be an application that is stored locally on the wireless communication, or which may be generated by sensors that are part of, or are coupled to, the wireless communication device.

The transition from low power state template may be referred to as a mask, such as may be used to filter a block of IP addresses. Such a mask may be used to indicate that a received message was received from an approved, or authorized, sender, or sending device, having an IP address that is within a range defined by the mask template. An authorized sender or sending device may be a telematics services server, a driverless vehicle operator's server, a vending machine owner/operator server, or any other computer device than manages one or more remote wireless machine devices via a wireless network that can maintain a registration to a device (i.e., maintain a default bearer between a wireless device and an APN of the network) while radio resources and data bearers (i.e., dedicated bearers) are idle.

The transition from low power state template may be a criterion, or criteria, that data or information in a received message must meet, match, or satisfy, before a determination can be made that the sender of the message is a legitimate sender that has authorization to awaken the second processor, or cause the second processor portion to transition from a low power state to a higher power state such that it can process application instructions and data. An example of a transition from low power state criteria may include a time stamp (if the time stamp in a message is not within a predetermined range of a current time of the wireless communication device, or within a current time accessible by the first processor portion (i.e., from a GPS receiver, from an external clock, or from the wireless network to which it is registered)), the first processor portion may determine that the received message is not valid and is not to be used as an impetus, or inducement, for causing the second processor portion to transition from low power state. An example of a transition from low power state criteria may include a cryptographic value, or a cryptographic key, such as a key value that matches, or that complements, a value stored in the memory, which may be a standalone memory such as a memory chip, or which memory may be a memory of a subscriber identity module ("SIM"), or SIM profile of the wireless communication device. Or, the cryptographic value may be based on a time value/time stamp, location coordinates, APN of the wireless communication network (such as APN 10 of network 4 shown in FIG. 4), or other value that an entity outside of the wireless communication network, or other than an entity authorized to interact with the wireless communication device, could not obtain or associate with the wireless communication device unless by chance or brute force. Alternatively, the criterion contained in the template could be the mere receipt of bits in a data field/section of a message, such as a TCP, UDP, or ICMP message, regardless of what information, if anything at all, that the bits in the data field of the message convey.

Continuing with discussion of FIG. 5, at step 515 the first processor enters a 'listening' mode. The first processor typically enters a listening mode when the second processor has 'gone to sleep', or entered a low power state, or entered a no power state. The listening mode may correspond to a status between the wireless communication network and the wireless communication device as EMM registered, but RCC Idle and ECM Idle, which status would correspond to no data packets flowing from or to the wireless communication device that require processing by the second processor portion.

At step 520, while in listening mode, the first processor receives a message from the wireless communication network. The received message may be a message from the wireless network that relates to maintaining tracking of the wireless communication device, which typically would not be a cause to awaken the second processor portion because the first processor portion (i.e., baseband or modem processor), typically can handle providing information to an MME, or similar, of the wireless communication network via non-access stratum messaging protocols.

At step 525, the first processor portion analyzes the message received at step 520. Such analysis may include determining whether the message is a message related to, for example, bearer management or tracking area update procedures. If the message received at step 520 is related to routine EMM registered procedures, for example, the first processor may determine at step 530 that the received message, or bits thereof, do not meet a transition from low power state criterion and return to listen mode at step 515 after performing whatever routine procedures may have been requested in the message received at step 520.

However, if the message at step 520 does not relate to routine procedures that the first processor typically is configured to handle by itself, the first processor may compare the message information evaluated at step 525 to a transition from low power state criterion, or template, at step 530. It will be appreciated that the first processor, or the transition from low power state template, may be configured to determine at step 520 that any message received and processed by the first processor, regardless of the information or data contents of the message, satisfy a transition from low power state criterion at step 530.

As discussed above, if information or date contained in the message received at step 520 meet, match, satisfy, pass through a mask, or otherwise pass a test corresponding to the criterion, or criteria, of the transition from low power state template, the first processor follows the 'Y' path from block 53 as shown in the figure. Examples of satisfaction of the test at step 530 are illustrated in FIGS. 7-11 and are described below in reference to the corresponding figures. For example, FIG. 7 illustrates information contained in an incoming message as matching transition from low power state template criteria because the addresses and ports identified in the message match the addresses and ports in the template. If the first processor evaluates at step 520 the incoming message shown in FIG. 7, the first processor would follow the 'Y' path from block 530. However, if the first processor evaluated at step 530 the incoming message shown in FIG. 8, which has a non-matching originating port value, the first processor would follow the 'N' path from block 530 and return to listen mode (after performing any messaging with the communications network in response to the received message, such as error reporting) without attempting to cause the second processor to transition from a low power state. Further discussion of the evaluation at step 530 in connection with FIGS. 7-11 is given elsewhere herein.

Upon a determination at step 530 that an incoming message received at step 520 satisfies a transition from low power state template, criterion, or criteria, method 500 advances to step 535 and the first processor portion generates a transition from low power state instruction and provides the transition from low power state instruction to the second processor portion at step 540. The transition from low power state may be as simple as a change in voltage level on a trigger/idle/wake pin, or lead, of the second processor portion, or the transition from low power state instruction may include a command for the second processor to perform an operation on information contained in the message received at step 520, on data or executable commands stored in the memory shared between the first and second processors, or on information or executable commands stored in another memory of the wireless communication device, such as a memory chip of such as a SIM or SIM profile. A step 545, the second processor transitions from a low power state in response to the awaken message, or signal, provided by the first processor, and begins processing information or data. Method 500 ends at step 550.

Figure 6:
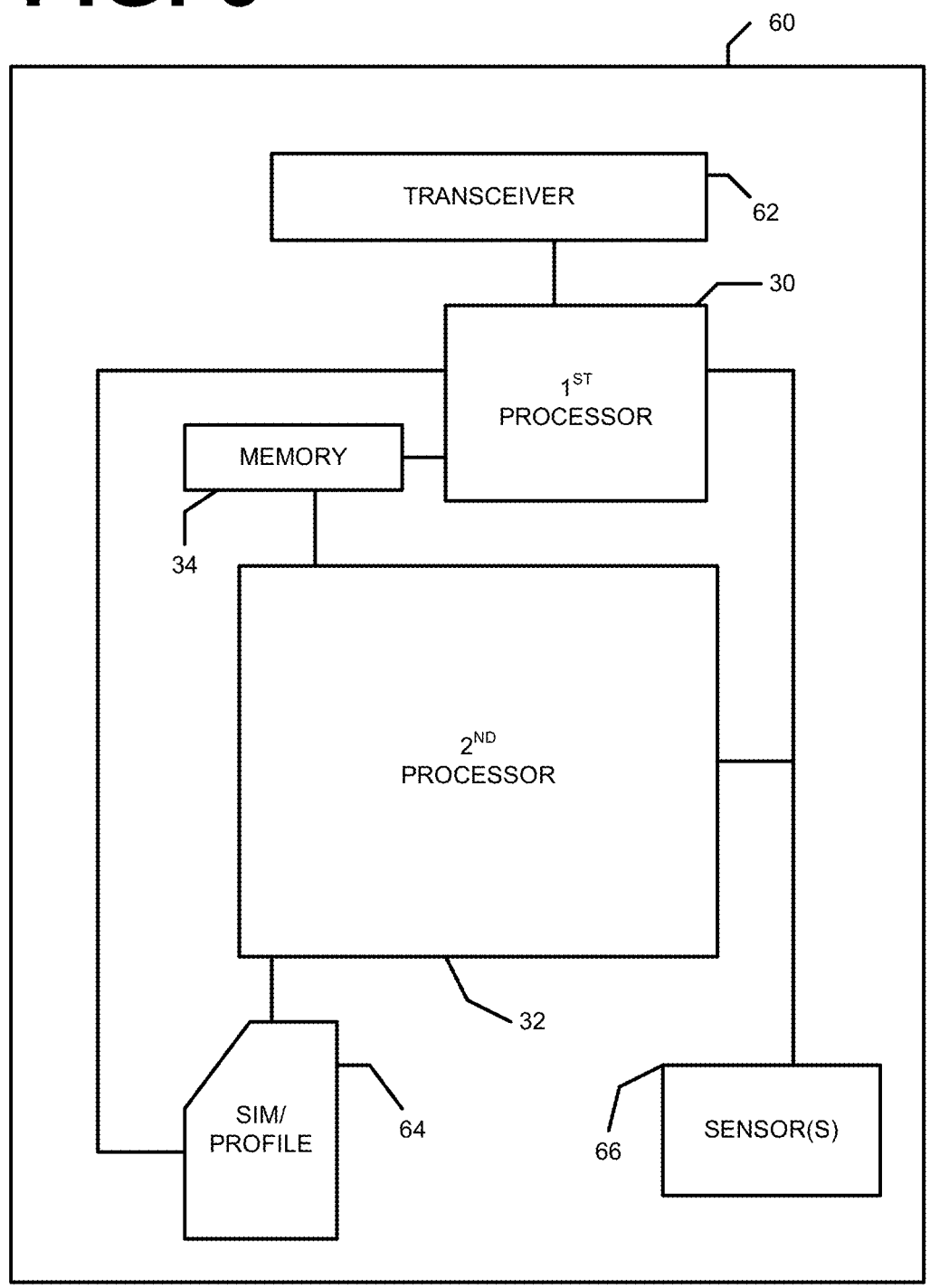
FIG. 6 illustrates a block diagram of a wireless UE communication device, which may be smart phone or which may be a non-consumer machine device, having first and second processor portions.

Turning now to FIG. 6, the figure illustrates a block diagram of a UE device 60, or a machine device, that includes a first processor 30, a second processor 32, and a shared memory 34. UE 60 includes radio front end circuitry 62, which may be referred to herein as a transceiver, but is understood to typically include transceiver circuitry, separate filters, and separate antennas for facilitating transmission and receiving of signals over a wireless link 12 as shown in FIG. 4. UE 60 of FIG. 6 may also include a SIM 64, or a SIM profile, which may comprise information stored in a memory (memory 34 or a separate memory portion), for facilitating wireless communication with network 4 shown in FIG. 4. SIM 64 is shown coupled to both the first processor portion 30 and second processor portion 32. Such an implementation provides an advantage that first processor portion 30 does not need to request and receive information or data from SIM 64 that second processor 32 may request, thus eliminating the use of the first processor acting as a 'go-between' when the second processor uses information from the SIM in performing its functions and in executing applications. First processor 30, which may be a modem processor or baseband processor, is shown smaller than processor 32, which may be a more sophisticated application processor, to visually indicate the relative levels of sophistication (i.e., processing capability and performance) and corresponding relative levels of operating power consumption levels between the two processor portions. Keeping the second processor portion asleep/inactive/in a low power state when UE 60 does not need it for executing applications and processing data related to an application provides an advantage of reducing power consumption when the UE only needs to use the first processor portion while in listening mode for routine bearer management and mobility management/maintenance procedures. UE 60 may also include sensors 66, as discussed elsewhere herein, that may provide signals to the first processor 30 or second processor 32. In an aspect, a signal from a sensor 66 may provide the message received by first processor 30 at step 520 of FIG. 5, while second processor 32 is in a low power state.

Turning now to FIG. 23, the figure illustrates a flow diagram of a method 2300 for implementing a fall-back, fail-over, or other type of backup transmitting of an awaken message. Method 2300 begins at step 2305. The steps of method 2300 may be carried out by a server, such as a machine-to-machine services server, a wireless communication network operator's server, a telematics service provider's server, a third-party service provider's server, or other type of server. In an aspect, a telematics server may manage all aspects of a fleet of vehicle UE telematics devices, including messaging, or, a third-party server may contract with a telematics service provider to perform some aspects of providing telematics services, including messaging with the UE devices associated with, or primarily managed by, the telematics server.

At step 2310, a server, may transmit a first awaken message to one, or more than one, of a plurality of UE devices that the server such as a telematics server, or a server associated and cooperating with the telematics server, may manage. The first awaken message may be transmitted according to a first protocol that is preferably a datagram protocol such as UDP. Upon transmitting the first awaken message, the server may set an expected response period timer at step 2315. The expected response period timer may be set to a value, such as an expected response period, that generally corresponds with an amount of time a typical user may expect the UE device to be available but may not actually use the UE device. Or, the expected response period timer may be set to a value that generally corresponds with an amount of time the server expects to receive messages from a UE device. The expected response timer value may be set to different value for different ones of the plurality of UE devices managed by the server.

At step 2320, the server determines whether the expected response time has expired (i.e., the more time has passed since the setting of the timer at step 2315 that the value that the timer was set to). If the server determination at step 2320 is NO, method 2300 returns to step 2320. If the server determines at step 2320 that expected response timer has expired, method 2300 follows the YES path to step 2325.

At step 2325, the telematics server (or other device carrying out one or more steps of method 2300, such as a third-party server or a wireless network provider's server) determines whether a response to the first awaken message has been received at the server. If the determination at step 2325 is YES, the server assumes that the first awaken message was satisfactorily delivered and that the UE to which it was directed exited from a low power state, and method 2300 ends at step 2340.

If, however, the determination at step 2325 is that a response to the first awaken message has not been received, method 2300 follows the NO path to step 2330. At step 2330, the server generates a second awaken message. At step 2335, the second awaken message is transmitted to the one or more UE devices according to a second protocol that is not the first format. Examples of the second protocol include Short Message Service ("SMS"), Multimedia Messaging Service ("MMS"), Mobile Terminated Incoming Call ("MTIC"), Rich Communications Service ("RCS"), iMessage (a messaging protocol used by Apple® iPhone® devices), IP multimedia Subsystem ("IMS"), or Session Initiated Protocol ("SIP"). Other similar protocols that are different from the first protocol may be used. Method 2300 ends at step 2340.

The fall back aspect discussed in reference to FIG. 23 may be used to overcome transmission problems that may exist as a result of poor wireless coverage of an area a given UE may be in when the server transmits a first awaken message at step 2310. Such poor coverage may exist when a vehicle that includes a given UE, or that is associated with a given UE, such as a telematics device or a telematics application running on a smart phone that is collocated with a vehicle, enters an underground parking deck, when the vehicle is in a rural area with sparse wireless signal coverage, or if the server transmitted the first awaken message during a period of wireless network data congestion. By using an alternative protocol, such as for example SMS, the second awaken message may be queued at an SMS center that may store and forward the second awaken message to the UE when is capable of receiving messages again. As SMS messaging is phased out, or if SMS is undesirable because of performance or cost concerns, other protocols that may also perform a store and forward function may be used for transmitting the second awaken message at step 2335, including the other protocols described above that may be used for transmitting the second awaken message.

FIG. 7 shows a simple Layer 3 example where a "Valid Template" is compared to an incoming message. In this example, baseband processor determines that the "Incoming Message" matches the valid template and the baseband processor initiates an action to alert the application processor. FIG. 8 shows a simple Layer 3 example where the "Valid Template" is compared to an incoming message. In this example, the "Valid Template" does not match the incoming message since the Originating Port on the incoming message is Port 227 while the baseband processor is expecting Port 18331. Since the "Valid Template" does not match the "Incoming Message", the baseband processor ignores the message and takes no action to alert the application processor.

FIG. 9 shows two example expansions on the original concept to further eliminate false alerts. In the first example, a cryptographic key, generated by some mechanism, whether completely random and agreed upon between the network-based alerting server and the mobile device, or using a cryptographic algorithm, where the key is cryptographically generated with a receiving UE using mechanisms where the key is not transmitted over the air, a match is required for the baseband processor to take any action and alert the application processor.

FIG. 10 illustrates an aspect where certain parts of the received message template can be masked, or ignored, to allow, for example, a range of Originating Addresses from 10.10.25.0 to 10.10.25.255 to be considered valid using the Ignore Field flag as shown. If the first processor portion performs an AND operation, for example, with the valid template criteria and the ignore mask, thus creating new template/criteria information, and then compares the incoming message to the new criteria, any Originating IP address that matches the first three octets of the new criteria would satisfy the transition from low power state criteria (i.e., the new criteria). In such a scenario, the new criteria may be referred to as transition from low power state criterion/criteria, or the combination of the Valid Template and the Ignore Mask may be referred to as the transition from low power state criteria. In another aspect, since the Template and the Mask can be "bit mapped", the address range may be narrowed to fewer than those within a range where a given octet is 'masked', for example just two different IP addresses could be a transition from low power state criteria.

FIG. 11 illustrates an implementation where multiple messages can be considered valid messages triggering the baseband processor to initiate a request to the second processor. An aspect may utilize one, or multiple, OSI level/layer of message tests before the first processor portion provides a transition from low power state instruction to activate an application processor. Typically, a first processor portion/baseband processor receives and processes Layers 2 and/or 3 information, followed by an application processor processing Layers 4 information/datagrams. Thus, transition from low power state criteria may include a MAC address of a device sending a message received by a wireless UE/machine device as OSI layer/level 2, or the transition from low power state criteria may include a logical address of a device sending the message received by the wireless UE/machine device.

Although the messages are broken down into nice blocks of Originating IP Address, Originating Port, Destination Port and Match Message, at Layer 3, this may be nothing more than a datagram containing data that has not been completely identified other than as bytes.

Ideally, the baseband processor and the application processor operate in tandem and are part of a single SOC, but alternatively, this architecture can be applied to any physical and electrical implementation. The baseband processing can be any number of processing elements and the application processing can use as many processing elements as are required. Preferably, the application processor can call an API that is part of the interface between the baseband processor and the application processor. The application processor can define the expected Incoming Messages and the Masks for each of the possible triggering events.

A triggering event can be one that enables additional functionality or it can be one that causes the Applications Processor to initiate an outgoing "secure" session as a client to a host server in the network. In the simplest of operations, the triggering event can be the incoming message itself or it can match any incoming message datagram, regardless of content and activate the Applications Processor. The message match functionality may use fixed and permanent templates or it may use temporary templates and masks or it may use variable templates that are based on conditions, either external as in GPS time or internal as in a cryptographic function generated by on-board algorithms or algorithms implemented in security devices such as SIM cards. Examples of match templates include hard wired templates, hard coded templates, templates loaded into registers or RAM and compared in the input datagrams. Templates could be variable and soft loaded by the application processor or fixed at the time of manufacture.

Upon receipt of the relevant triggering action, the Applications Processor can begin a "secure" session as a client to a host. The Applications Processor could also operate as a server, receiving the triggering event datagram as the first step or login into the wireless mobile device based server that begins communications. The server could be a secure server and the initial datagram is the first message (also called Client Hello) of a TLS Handshake stream. Since any random data input could trigger this event, a more complex match message is desirable to eliminate Denial-of-Service attacks where unknown attackers continuously flood the device with random data and messages, causing a battery-powered IoT device to use valuable power to respond or initiate a power-consuming data session only to discover that there is no legitimate external request for a data connection with the device.

What is claimed is:

1. A method, comprising:
generating, at a server, awaken information derived from a shared value and a stored secret value, wherein only the server and a single UE device remote from the server and managed by the server, can obtain the stored secret value;
transmitting the awaken information in an awaken message to the UE device when the server determines that the UE device is in a low-power state and should exit the low power state; and
wherein the awaken information is to be used by the UE device to determine to exit the low power state when the awaken information matches a transition from low power state criterion; and
wherein the stored secret value is a secret value stored in a SIM of the UE device when the SIM was manufactured, provisioned, personalized, updated, or otherwise programmed and wherein the stored secret value is unique to the SIM of the UE device.

2. The method of claim 1 wherein the UE device includes a modem processor to compare the awaken information to the transition from low power state criterion and to instruct an application processor of the UE device to exit the low power state if the awaken information matches the transition from low power state criterion.

3. The method of claim 1 wherein the shared value that is used in conjunction with the stored secret value to derive the awaken information and that is shared with the UE device is a one-time value.

4. The method of claim 1 further comprising:
setting an expected response timer at the server to a predetermined expected response period when transmitting the awaken message to the UE device according to a first protocol, wherein the awaken message is a first awaken message;
generating a second awaken message at the server if the server does not receive a response, within the predetermined expected response period, that the UE device exited from the low power state, wherein the second awaken message includes the awaken information that was derived from the shared value and the stored secret value and that was transmitted in the first awaken message; and
transmitting the second awaken message to the UE device according to a second protocol that is different from the first protocol.

5. The method of claim 4 wherein the second protocol is one of at least: Short Message Service ("SMS"), Multimedia Messaging Service ("MMS"), Mobile Terminated Incoming Call ("MTIC"), Rich Communications Service ("RCS"), iMessage (a messaging protocol used by Apple® iPhone® devices), IP multimedia Subsystem ("IMS"), or Session Initiated Protocol ("SIP").

6. The method of claim 1 wherein the first awaken message is transmitted according to an IP data protocol that is not one of at least: Short Message Service ("SMS"), Multimedia Messaging Service ("MMS"), Mobile Terminated Incoming Call ("MTIC"), Rich Communications Service ("RCS"), iMessage (a messaging protocol used by Apple® iPhone® devices), IP multimedia Subsystem ("IMS"), or Session Initiated Protocol ("SIP").

7. The method of claim 4 wherein the UE device evaluates the contents of a message received according to the second protocol to determine whether the contents include awaken information to compare to transition from low power state criterion, and wherein the UE devices does not perform any action based on the second-protocol message if the contents of the second-protocol message do not include awaken information.

8. The method of claim 1 further comprising:
transmitting from the server to the UE device a new shared value to use in conjunction with the stored secret value to derive new transition from low power state criterion for comparing to a future awaken message from the server.

9. The method of claim 1 further comprising:
transmitting from the UE device to the server a new shared value to use in conjunction with the stored secret value to derive new awaken information for generating a future awaken message for a future exiting of the UE device from a low power state.

10. The method of claim 8 wherein the new transition from low power state is only used for comparing to a future awaken message if the most recent exiting of the UE device from a low power state occurred as a result of awaken information received in an awaken message matching a corresponding transition from low power state criterion.

11. The method of claim 1 wherein the stored secret value is used to encrypt the shared value before the shared value is shared between the server and the UE device.

12. The method of claim 1 further comprising:
resetting an awake timer managed by the server to a predetermined awake period value associated with the UE device when a communication between the server and UE device is received by or transmitted by the server, wherein the predetermined awake period to which the awake timer at the server is reset corresponds to a predetermined awake period value to which a sleep timer at the UE is reset when a communication between the server and UE device is received by or transmitted by the UE;
determining at the server that the UE device is in a low-power state and should exit the low power state when a message is received at or generated by the server to be forwarded to the UE device and when the awake timer managed by the server has expired.

13. The method of claim 1:
wherein the server and the UE device shared the shared value, used with the stored secret value to derive the awaken information, before the UE device entered the low power state for which the awaken information will be compared with the transition from low power state criterion by the UE to determine whether to exit the low power state when the awaken information matches the transition from low power state criterion; and
wherein the UE device generated the transition from low power state criterion, based on the shared value and stored secret value, before going into the low power state for which the awaken information will be compared with the transition from low power state criterion by the UE to determine whether to exit the low power state when the awaken information matches the transition from low power state criterion.

14. The method of claim 1 wherein the server and the UE device share the shared value, used with the stored secret value to derive the awaken information, when the server transmits the awaken message to the UE device and wherein the UE device generates the transition from low power state criterion, based on the shared value and stored secret value, when the UE device receives the awaken message.

15. The method of claim 1 wherein the UE is in a low power state but is in a data connected state.

16. A system, comprising:
a server including at least one processor to generate awaken information derived from a shared value and a stored secret value and to transmit the awaken information in an awaken message to a UE device that is uniquely associated with the stored secret value and that is remote from the server and managed by the server, wherein the UE device includes a first processor and a second processor, and wherein the second processor enters a low power state when processing of application data is not required of the UE device;
wherein only the server and the UE device have access to the stored secret value, and wherein the stored secret value is unique to the UE device;
wherein the server and the UE device share the shared value, used with the stored secret value to derive the awaken information, before the second processor of the UE device enters the low power state;
wherein the UE device generates a transition from low power state criterion, based on the value and stored secret value, before going into the low power state; and
wherein the awaken information is to be used by the UE device to exit the low power state when the awaken information matches the transition from low power state criterion.

17. The system of claim 16 wherein the UE device includes a modem processor to compare the awaken information to the transition from low power state criterion and to instruct an application processor of the UE device to exit the low power state.

18. The system of claim 17 further comprising:
wherein the server sets a timer to a predetermined expected response period when transmitting the awaken information to the UE device in the awaken message according to a first protocol, wherein the awaken message is a first awaken message;
generating a second awaken message at the server if the server does not receive a response, within the predetermined expected response period, that the application processor of the UE device exited from the low power state, wherein the second awaken message includes the awaken information that was derived from the shared value and the stored secret value and that was transmitted in the first awaken message; and
transmitting the second awaken message to the UE device according to a second protocol that is different from the first protocol.

19. The system of claim 18 wherein the second protocol is one of at least: Short Message Service ("SMS"), Multimedia Messaging Service ("MMS"), Mobile Terminated Incoming Call ("MTIC"), Rich Communications Service ("RCS"), iMessage (a messaging protocol used by Apple® iPhone® devices), IP multimedia Subsystem ("IMS"), or Session Initiated Protocol ("SIP").

20. The system of claim 18 wherein the first awaken message is transmitted according to an IP data protocol that is not one of at least: Short Message Service ("SMS"), Multimedia Messaging Service ("MMS"), Mobile Terminated Incoming Call ("MTIC"), Rich Communications Service ("RCS"), iMessage (a messaging protocol used by Apple® iPhone® devices), IP multimedia Subsystem ("IMS"), or Session Initiated Protocol ("SIP").

21. The system of claim 18 wherein the modem processor of the UE device evaluates the contents of the second awaken message to determine whether the contents include awaken information to compare to transition from low power state criterion, and wherein the UE devices does not perform any action based on the second message if the contents of the second message do not include awaken information.

22. A telematics server, comprising:
at least one processor to:
generate awaken information derived from a value and a stored secret value, wherein only the server and a single UE device remote from the server, and managed by the server, can obtain the stored secret value, wherein the stored secret value is unique to the single UE device;
transmit the awaken information in a first awaken message to the UE device when the telematics server determines that the UE device is in a low-power state and should exit the low power state;
wherein the telematics server and the UE device shared the value, used with the stored secret value to derive the awaken information, before the UE device entered the low power state;
wherein the UE device generated a transition from low power state criterion, based on the value and stored secret value, before going into the low power state; and
wherein the awaken information is to be used by the UE device to exit the low power state when the awaken information matches the transition from low power state criterion.

23. The telematics server of claim 22 further comprising:
wherein the telematics server sets a timer to a predetermined expected response period when transmitting the first awaken message to the UE device according to a first protocol;
generating a second awaken message at the telematics server if the telematics server does not receive a response, within the predetermined expected response period, that the application processor of the UE device exited from the low power state, wherein the second awaken message includes the awaken information that was derived from the value and the stored secret value and that was transmitted in the first awaken message; and transmitting the second awaken message to the UE device according to a second protocol that is different from the first protocol.

24. A method, comprising:

generating, at a server, awaken information derived from a shared value and a stored secret value, wherein only the server and a single UE device remote from the server and managed by the server, can obtain the stored secret value;

transmitting the awaken information in a first awaken message to the UE device when the server determines that the UE device is in a low-power state and should exit the low power state;

wherein the awaken information is to be used by the UE device to determine to exit the low power state when the awaken information matches a transition from low power state criterion;

setting an expected response timer at the server to a predetermined expected response period when transmitting the first awaken message to the UE device according to a first protocol;

generating a second awaken message at the server if the server does not receive a response, within the predetermined expected response period, that the UE device exited from the low power state, wherein the second awaken message includes the awaken information that was derived from the shared value and the stored secret value and that was transmitted in the first awaken message; and transmitting the second awaken message to the UE device according to a second protocol that is different from the first protocol.

25. The method of claim 24 wherein the second protocol is one of at least: Short Message Service ("SMS"), Multimedia Messaging Service ("MMS"), Mobile Terminated Incoming Call ("MTIC"), Rich Communications Service ("RCS"), iMessage (a messaging protocol used by Apple® iPhone® devices), IP multimedia Subsystem ("IMS"), or Session Initiated Protocol ("SIP").

26. The method of claim 24 wherein the first awaken message is transmitted according to an IP data protocol that is not one of at least: Short Message Service ("SMS"), Multimedia Messaging Service ("MMS"), Mobile Terminated Incoming Call ("MTIC"), Rich Communications Service ("RCS"), iMessage (a messaging protocol used by Apple® iPhone® devices), IP multimedia Subsystem ("IMS"), or Session Initiated Protocol ("SIP").

27. The method of claim 24 wherein the UE device evaluates the contents of a message received according to the second protocol to determine whether the contents include awaken information to compare to transition from low power state criterion, and wherein the UE devices does not perform any action based on the second-protocol message if the contents of the second-protocol message do not include awaken information.

28. A method, comprising:

generating, at a server, awaken information derived from a shared value and a stored secret value, wherein only the server and a single UE device remote from the server and managed by the server, can obtain the stored secret value;

transmitting the awaken information in an awaken message to the UE device when the server determines that the UE device is in a low-power state and should exit the low power state;

wherein the awaken information is to be used by the UE device to determine to exit the low power state when the awaken information matches a transition from low power state criterion;

resetting an awake timer managed by the server to a predetermined awake period value associated with the UE device when a communication between the server and UE device is received by or transmitted by the server, wherein the predetermined awake period to which the awake timer at the server is reset corresponds to a predetermined awake period value to which a sleep timer at the UE is reset when a communication between the server and UE device is received by or transmitted by the UE; and determining at the server that the UE device is in a low-power state and should exit the low power state when a message is received at or generated by the server to be forwarded to the UE device and when the awake timer managed by the server has expired.

29. A method, comprising:

generating, at a server, awaken information derived from a shared value and a stored secret value, wherein only the server and a single UE device remote from the server and managed by the server, can obtain the stored secret value;

transmitting the awaken information in an awaken message to the UE device when the server determines that the UE device is in a low-power state and should exit the low power state;

wherein the awaken information is to be used by the UE device to determine to exit the low power state when the awaken information matches a transition from low power state criterion;

wherein the server and the UE device shared the shared value, used with the stored secret value to derive the awaken information, before the UE device entered the low power state for which the awaken information will be compared with the transition from low power state criterion by the UE to determine whether to exit the low power state when the awaken information matches the transition from low power state criterion; and wherein the UE device generated the transition from low power state criterion, based on the shared value and stored secret value, before going into the low power state for which the awaken information will be compared with the transition from low power state criterion by the UE to determine whether to exit the low power state when the awaken information matches the transition from low power state criterion.

* * * * *